US012041189B2

(12) United States Patent
Jang et al.

(10) Patent No.: US 12,041,189 B2
(45) Date of Patent: Jul. 16, 2024

(54) METHOD FOR STORING AND RECOVERING KEY FOR BLOCKCHAIN-BASED SYSTEM, AND DEVICE THEREFOR

(71) Applicant: Samsung Electronics Co., Ltd., Suwon-si (KR)

(72) Inventors: Wooseok Jang, Suwon-si (KR); Moonsung Na, Suwon-si (KR); Sungwook Won, Suwon-si (KR); Sunghyuk Lee, Suwon-si (KR); Youna Lee, Suwon-si (KR); Euiheon Jeong, Suwon-si (KR); Seongmin Je, Suwon-si (KR); Jinsu Jo, Suwon-si (KR); Jongkeun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 17/722,888

(22) Filed: Apr. 18, 2022

(65) Prior Publication Data
US 2022/0239509 A1 Jul. 28, 2022

Related U.S. Application Data

(63) Continuation of application No. PCT/KR2020/014063, filed on Oct. 15, 2020.

(30) Foreign Application Priority Data

Oct. 18, 2019 (KR) ........................ 10-2019-0129975

(51) Int. Cl.
*H04L 29/06* (2006.01)
*H04L 9/00* (2022.01)
(Continued)

(52) U.S. Cl.
CPC .............. *H04L 9/50* (2022.05); *H04L 9/0819* (2013.01); *H04L 9/0844* (2013.01); *H04L 9/3236* (2013.01)

(58) Field of Classification Search
CPC ....... H04L 9/50; H04L 9/0819; H04L 9/0844; H04L 9/3236; H04L 9/085; H04L 9/3239;
(Continued)

(56) References Cited

U.S. PATENT DOCUMENTS 8,615,666 B2 12/2013 Yasuda et al.
8,886,931 B2 11/2014 Matsunaka et al.
(Continued)

FOREIGN PATENT DOCUMENTS

JP H11-239124 A 8/1999
KR 10-2006-0078768 A 7/2006
(Continued)

*Primary Examiner* — Mahfuzur Rahman
(74) *Attorney, Agent, or Firm* — Jefferson IP Law, LLP

(57) ABSTRACT

An electronic device is provided. The electronic device includes a memory, a communication circuit, a display, and a processor connected to the memory, the communication circuit, and the display, wherein the memory stores instructions which, when executed, cause the processor to acquire device information relating to a plurality of external electronic devices, on the basis of the device information, select a plurality of distribution storage devices for storing a distribution key from among the plurality of external electronic devices, generate a plurality of distribution keys obtained by dividing mnemonic information or a seed value for generating a key for electronically signing data to be transmitted to a blockchain network, and control the communication circuit such that the plurality of distribution keys are distributed and transmitted to the plurality of distribution storage devices.

20 Claims, 27 Drawing Sheets

(51) Int. Cl.
*H04L 9/08* (2006.01)
*H04L 9/32* (2006.01)

(58) Field of Classification Search
CPC ... H04L 9/3247; H04L 9/0894; H04L 9/3231; G06F 21/602; G06F 21/64
See application file for complete search history.

(56) References Cited

U.S. PATENT DOCUMENTS

| | | | |
|---|---|---|---|
| 10,659,223 B2 | 5/2020 | Wright et al. | |
| 11,501,370 B1* | 11/2022 | Paya | G06Q 20/3676 |
| 2007/0011466 A1 | 1/2007 | Mura | |
| 2007/0239615 A1 | 10/2007 | Matsuzaki et al. | |
| 2018/0183602 A1* | 6/2018 | Campagna | H04L 9/14 |
| 2018/0189753 A1 | 7/2018 | Konda et al. | |
| 2018/0232526 A1* | 8/2018 | Reid | G06F 21/6218 |
| 2019/0121988 A1 | 4/2019 | Van De Ruit et al. | |
| 2019/0213462 A1* | 7/2019 | McDonald | G06K 19/07 |
| 2019/0238318 A1* | 8/2019 | Williams | H04L 9/3239 |
| 2019/0349426 A1* | 11/2019 | Smith | G06F 16/1824 |
| 2020/0280433 A1 | 9/2020 | Wright et al. | |
| 2022/0140999 A1* | 5/2022 | Reid | H04L 9/3231 713/171 |
| 2022/0239509 A1* | 7/2022 | Jang | G06F 21/602 |

FOREIGN PATENT DOCUMENTS

| | | |
|---|---|---|
| KR | 10-2011-0127695 A | 11/2011 |
| KR | 10-1307573 B1 | 11/2013 |
| KR | 10-1657243 B1 | 9/2016 |
| KR | 10-1864213 B1 | 6/2018 |
| KR | 10-2018-0080655 A | 7/2018 |
| KR | 10-2018-0115701 A | 10/2018 |

* cited by examiner

| DEVICE TYPE | DEVICE ID | DEVICE NAME | DISTRIBUTED KEY ID |
|---|---|---|---|
| Air conditioner | 1B-2A-56-41-CD-64 | ROOM 1 AIR CONDITIONER | A |
| Wearable Device | AA-BB-CC-DD-EE-FF | SMART WATCH | B,C |
| Television | XX-AA-11-22-33-44 | LIVING ROOM TV | A,B |
| Blockchain | 0xaa0e6230fb87a2a7 | ETHER** | C |

| KEY VALUE OF DISTRIBUTED STORAGE TARGET | This is the Samsung SECRET that will be separated |
|---|---|
| MINIMUM REQUIRED VALUE (THRESHOLD) | 3 |
| DISTRIBUTED KEY VALUE | 6 |

2520

GENERATED DISTRIBUTED KEY

| No. | DISTRIBUTED KEY VALUE |
|---|---|
| 1 | 1-78af740ae8908b31e46aa4c1ae1db6e6c2bb932ae0119050f39850f1d035cd66a780a4fe14a2604df1bc968c75be02d856 |
| 2 | 2-31d8947be092293a9d33fe69dcd61f79e016ae33f56fdacc666226e5144e5c8e193718cb5ac8bfd5e2e118381e40ce53c8 |
| 3 | 3-7e6cd26b83e869344ff22da13963a680b54e54b3679083b7c8bfd56a28828f5f4623ce4915e02a7b63be943e8fcdbec2f8 |
| 4 | 4-5c30d7deeb2a875459f6de0d1501a1800d182cfbf4126aa4b17b225f192c0ca945f9b9dc2543e4201613751075717ed7da |
| 5 | 5-138491ce8850c75a8b370dc5f0b418795840d67b66ed33df1fa6d1d025e0df781aed6f5e6a6b718e974cf916e4fc0e46f8 |
| 6 | 6-5af371bf80526551f26e576d827fb1e67aedeb62739379438a5ca7c4e19b4e90a45ad36b2401ae16841177a28f02c2cd42 |

FIG.25

OBTAIN DISTRIBUTED KEY 2530

| No. | DISTRIBUTED KEY VALUE |
|---|---|
| 1 | 1-78af740ae8908b31e46aa4c1ae1db6e6c2bb932ae0119050f39850f1d035cd66a780a4fe14a2604df1bc968c75be02d856 |
| 2 | 2-31d8947be092293a9d33fe69dcd61f79e016ae33f56fdacc666226e5144e5c8e193718cb5ac8bfd5e2e118381e40ce53c8 |
| 3 | 3-7e6cd26b83e869344ff22da13963a680b54e54b3679083b7c8bfd56a28828f5f4623ce4915e02a7b63be943e8fcdbec2f8 |

| RECOVERED RESULT | This is the Samsung SECRET that will be separated | 2535 |

OBTAIN DISTRIBUTED KEY 2540

| No. | DISTRIBUTED KEY VALUE |
|---|---|
| 1 | 1-78af740ae8908b31e46aa4c1ae1db6e6c2bb932ae0119050f39850f1d035cd66a780a4fe14a2604df1bc968c75be02d856 |
| 3 | 3-7e6cd26b83e869344ff22da13963a680b54e54b3679083b7c8bfd56a28828f5f4623ce4915e02a7b63be943e8fcdbec2f8 |
| 6 | 6-5af371bf80526551f26e576d827fb1e67aedeb62739379438a5ca7c4e19b4e90a45ad36b2401ae16841177a28f02c2cd42 |

| RECOVERED RESULT | This is the Samsung SECRET that will be separated | 2545 |

FIG.26

OBTAIN DISTRIBUTED KEY 2550

| No. | DISTRIBUTED KEY VALUE |
|---|---|
| 3 | 3-7e6cd26b83e869344ff22da13963a680b54e54b3679083b7c8bfd56a28828f5f4623ce4915e02a7b63be943e8fcdbec2f8 |
| 4 | 4-5c30d7deeb2a875459f6de0d1501a1800d182cfbf4126aa4b17b225f192c0ca945f9b9dc2543e4201613751075717ed7da |
| 5 | 5-138491ce8850c75a8b370dc5f0b418795840d67b66ed33df1fa6d1d025e0df781aed6f5e6a6b718e974cf916e4fc0e46f8 |
| 6 | 6-5af371bf80526551f26e576d827fb1e67aedeb62739379438a5ca7c4e19b4e90a45ad36b2401ae16841177a28f02c2cd42 |

⇩ 2555

| RECOVERED RESULT | This is the Samsung SECRET that will be separated |
|---|---|

OBTAIN DISTRIBUTED KEY 2560

| No. | DISTRIBUTED KEY VALUE |
|---|---|
| 1 | 1-78af740ae8908b31e46aa4c1ae1db6e6c2bb932ae0119050f39850f1d035cd66a780a4fe14a2604df1bc968c75be02d856 |
| 2 | 2-31d8947be092293a9d33fe69dcd61f79e016ae33f56fdacc666226e5144e5c8e193718cb5ac8bfd5e2e118381e40ce53c8 |

⇩ 2565

| RECOVERED RESULT | Failed |
|---|---|

FIG.27

METHOD FOR STORING AND RECOVERING KEY FOR BLOCKCHAIN-BASED SYSTEM, AND DEVICE THEREFOR

CROSS-REFERENCE TO RELATED APPLICATION(S)

This application is a continuation application, claiming priority under § 365(c), of an International application No. PCT/KR2020/014063, filed on Oct. 15, 2020, which is based on and claims the benefit of a Korean patent application number 10-2019-0129975, filed on Oct. 18, 2019, in the Korean Intellectual Property Office, the disclosure of which is incorporated by reference herein in its entirety.

BACKGROUND

1. Field

The disclosure relates to technologies of storing and recovering a key for a blockchain-based system.

2. Description of Related Art

Like communication between two or more nodes in a network, encryption as a technology for securely storing sensitive data is accompanied. A node may include a mobile communication device, a tablet computer, a laptop computer, a desktop, a computing device, a server device of the network, a client device of the network, or one or more nodes of a distributed network. The node may be associated with, for example, a blockchain technology which uses a group of persons such as natural persons or employees of a company, a system such as a bank system, or distributed ledgers.

Two or more nodes may be unsecured against unauthorized third parties and may be connected with a communication network vulnerable to eavesdropping or interference. Thus, the message transmitted between nodes may be transmitted in the form of being encrypted. When receiving the message, an intended receiver decrypts the message using various decryption methods. For example, the encrypted message may be decrypted using a decryption key generated based on a public or secret key scheme by a method for decrypting the encrypted message. In a communication network, security may be important to prevent a third party from identifying the corresponding decryption key.

One encryption method includes using a symmetric-key algorithm. The key is symmetric in that the same symmetric key is used for encryption of plain text messages and decryption of cipher text messages. However, the symmetric key should be securely transmitted to both of two nodes to prevent unauthenticated access. For example, the symmetric key may be physically delivered to an (authenticated) node such that the symmetric key is not transmitted over an insecure communication network. However, it is not always able to physically deliver the symmetric key. Thus, when the symmetric key is delivered over an insecure electronic network such as the Internet, a problem in a symmetric key encryption system has a high risk when the symmetric key is decrypted or stolen by a hacker. As symmetric key algorithms and protocols are simply and widely used, methods for securely transmitting the symmetric key over a secure network are required.

Asymmetric key cryptography, also called public key cryptography, solves some of the problems capable of occurring when using the symmetric key. While the private key is kept secret, the corresponding public key may be made publicly available. Thus, the threat of hacking the public key in the network may not be large. There is the Diffie-Hellman key exchange and three pass protocol as a protocol to which the public key cryptography is applied.

A key pair may be generated using a seed value (e.g., a root seed) or mnemonic information. For example, a private key may be generated from the seed value using a hash function, and a public key corresponding to the private key may be generated. The mnemonic information may be a word string (e.g., an English word string) used to generate the seed value. For example, the seed value may be generated from the mnemonic information, using a password-based key derivation function 2 (PBKDF2) function.

The above information is presented as background information only to assist with an understanding of the disclosure. No determination has been made, and no assertion is made, as to whether any of the above might be applicable as prior art with regard to the disclosure.

SUMMARY

Storing a private key or a seed value or mnemonic information associated with the private key in a memory area of an electronic device may cause serious security problems. For example, a digital wallet such as a Bitcoin wallet may include software (e.g., an electronic wallet) capable of being connected with another node which participates in a blockchain for authentication of a transaction, when generating the transaction such as transmitting bitcoins. For example, the blockchain may be used to perform encryption of important information necessary for a blockchain transaction using public key cryptography and perform a digital signature for the transaction. At this time, a private key used to generate the transaction may be stored by the wallet ("client side") installed in a user device or a wallet service provider ("server side"). However, when the private key is stored only in the client side, it may be damaged through theft, loss, or damage to the user's hardware, such as a computer, a mobile phone, or the like. Similarly, when a user dies or becomes incapacitated, it is impossible to recover or access the private key, and it is impossible to access assets on the blockchain mapped to the private key. When the private key or the seed value or mnemonic information for recovering the private key is stored in storage of the server side, such problems may be overcome. However, due to security issues on the server side, when it is hacked, there is a security problem where the private key may be leaked.

Aspects of the disclosure are to address at least the above-mentioned problems and/or disadvantages and to provide at least the advantages described below. Accordingly, an aspect of the disclosure is to provide a method and an apparatus capable of securely storing and recovering a private key and a seed value or mnemonic information associated with the private key.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a communication circuit, a display, and a processor connected with the memory, the communication circuit, and the display. The memory may store instructions, when executed, causing the processor to obtain device information about a plurality of external electronic devices, select a plurality of distributed storage devices for storing a distributed key from the plurality of external electronic devices, based on the device information, generate a plurality of distributed keys to divide a seed value or mnemonic information for generating a key for performing a digital signature on data to be transmitted to a blockchain network, and control the communication circuit such that the plurality of distributed keys are distributed and transmitted to the plurality of distributed storage devices.

In accordance with another aspect of the disclosure, an electronic device is provided. The electronic device includes a memory, a communication circuit, and a processor connected with the memory and the communication circuit. The memory may store instructions, when executed, causing the processor to obtain device information including information about a first external electronic device or a second external electronic device, generate a first distributed key and a second distributed key for recovering a key value, based on the device information, transmit the first distributed key to the first external device through the communication circuit, transmit the second distributed key to the second external device, obtain the first distributed key and the second distributed key from the first external electronic device and the second external electronic device, when an event for generating blockchain transaction data to be transmitted to a blockchain network occurs, and perform a digital signature on the blockchain transaction data, based on a key value recovered using the first distributed key and the second distributed key.

In accordance with another aspect of the disclosure, a server is provided. The server includes a memory, a communication circuit, and a processor connected with the memory and the communication circuit. The memory may store instructions, when executed, causing the processor to obtain device information about a plurality of external electronic devices associated with a user account, receive a distributed key storage request requesting to store a plurality of distributed keys to divide a seed value or mnemonic information for generating a key for performing a digital signature on data to be transmitted to a blockchain network by an electronic device logged in to the server with the user account from the electronic device, select a plurality of distributed storage devices based on the device information, in response to the distributed key storage request, distribute and transmit the plurality of distributed keys to the plurality of distributed storage devices, through the communication circuit, and associate and store identification information of the plurality of distributed storage devices with the user account in the memory.

In accordance with another aspect of the disclosure, an electronic device is provided. The electronic device includes a memory, a communication circuit, a display, and a processor connected with the memory, the communication circuit, and the display. The memory may store instructions, when executed, causing the processor to receive a storage request for at least one distributed key to divide a seed value or mnemonic information for generating a key for performing a digital signature on data to be transmitted to a blockchain network from an external server, store the at least one distributed key in the memory in response to the storage request, receive an access request for the at least one distributed key from the external server through the communication circuit, and output a notification message through the display, in response to the access request.

In accordance with another aspect of the disclosure, a method for recovering a key value in an electronic device is provided. The method includes obtaining device information about a plurality of external electronic devices, selecting a plurality of distributed storage devices for storing a distributed key from the plurality of external electronic devices, based on the device information, generating a plurality of distributed keys to divide a seed value or mnemonic information for generating a key for performing a digital signature on data to be transmitted to a blockchain network, and distributing and transmitting the plurality of distributed keys to the plurality of distributed storage devices.

According to embodiments disclosed in the disclosure, a method and an apparatus capable of distributing and securely storing a key value may be provided.

According to embodiments disclosed in the disclosure, a method and an apparatus for preventing a key value from being stolen although information of a storage institution which stores important information about distributing and storing a key value is stolen or although the storage institution wants to misuse it may be provided.

According to embodiments disclosed in the disclosure, a method and an apparatus capable of recovering a key value without the necessity that a user memorizes information such as a password for recovering the key value may be provided.

According to embodiments disclosed in the disclosure, a method and an apparatus capable of recovering a key value without the necessity that the user memorizes a device which distributes and stores the key value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates an example of device identification information stored in a server, according to an embodiment of the disclosure;

FIG. 25 illustrates an example of a distributed key generated in a determined condition, according to an embodiment of the disclosure;

FIG. 26 illustrates an example of recovering a key value using some of distributed keys which are distributed and stored, according an embodiment of the disclosure; and FIG. 27 illustrates an example of recovering a key value using some of distributed keys which are distributed and stored, according an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
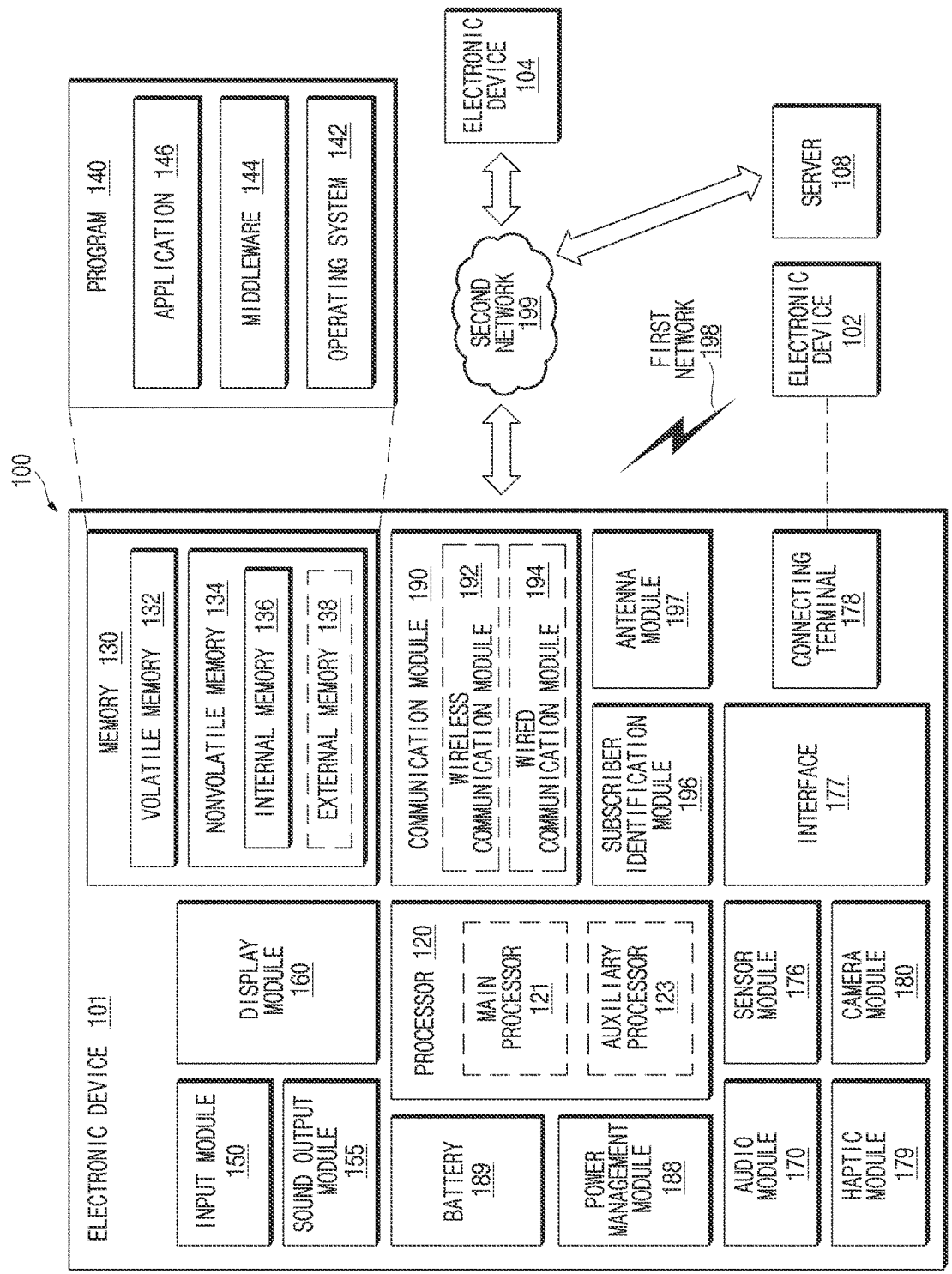
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
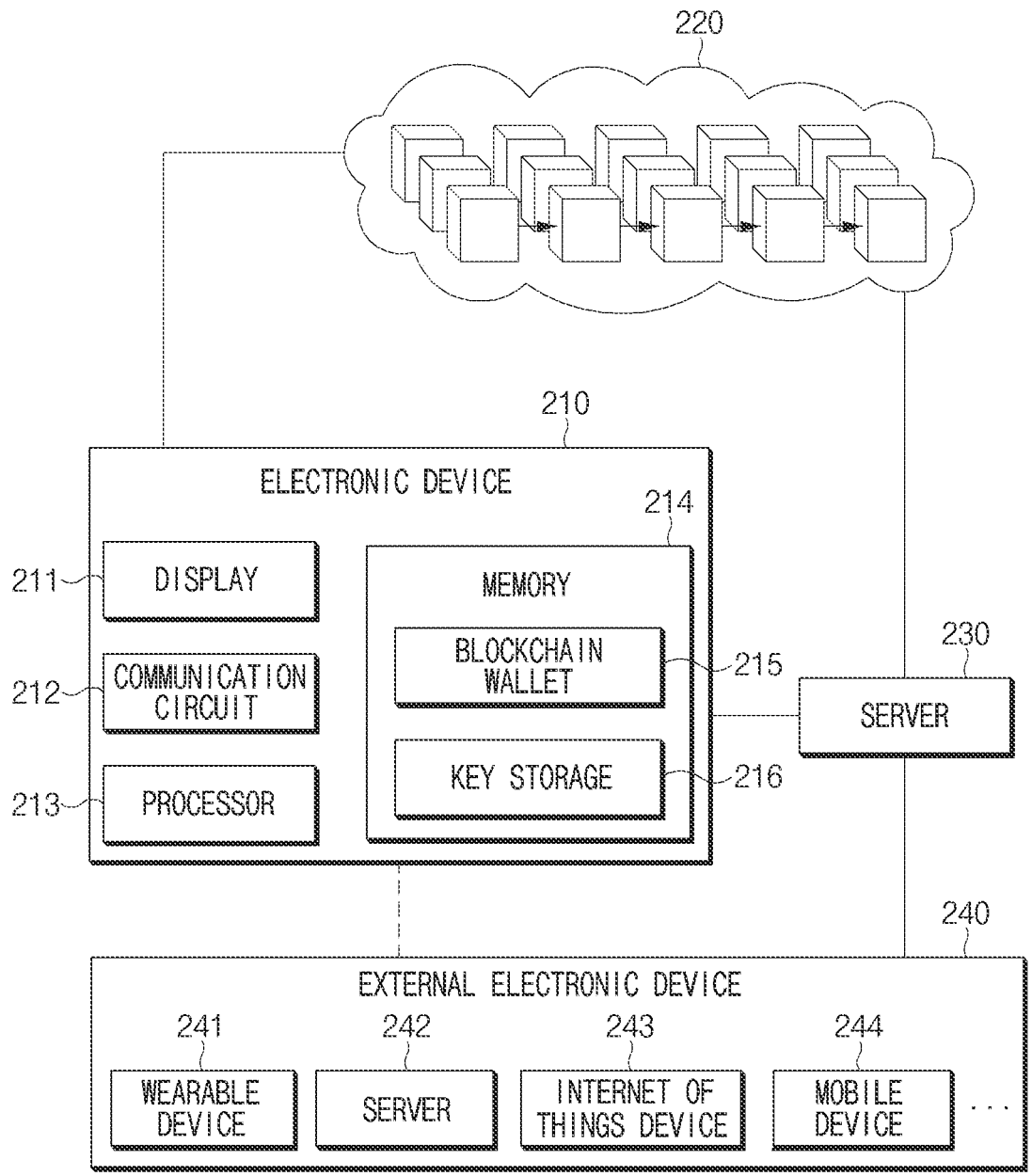
FIG. 2 illustrates a configuration of a system including an electronic device and a server, according to an embodiment of the disclosure.

FIG. 2 illustrates a configuration of a system including an electronic device (e.g., an electronic device of FIG. 1) and a server (e.g., a server of FIG. 1), according to an embodiment of the disclosure.

Referring to FIG. 2, a system may include an electronic device 210, a server 230, and an external electronic device 240 (e.g., an electronic device 102 or an electronic device 104 of FIG. 1).

When a blockchain transaction event for generating blockchain transaction data occurs, the electronic device 210 may authenticate a corresponding transaction using a node of a blockchain network 220 and may transmit the blockchain transaction data to the blockchain network 220 to be recorded in a blockchain. The blockchain transaction data may include information associated with a transaction recorded in a node in the blockchain network 220. For example, when receiving a user input requesting remittance processing based on a blockchain system, the electronic device 210 may transmit blockchain transaction data including information about remittance details to the blockchain network 220. According to an embodiment, the transaction may include a recipient address, a signature identifying a sender, or value information indicating a transmitted amount. Data included in the transaction may vary with a type of a blockchain. In case of Ethereum, the data included in the transaction may further include a selectable data field or gas price (a fee which will be paid by a user) information. According to an embodiment, the electronic device 210 may perform a digital signature on blockchain transaction data using a private key generated for each user and may transmit the digitally signed blockchain transaction data to the blockchain network 220. The digital signature is a technology for preventing electronic documents or digital data from being falsified and identifying an entity who generates the signature, which is used when exchanging an electronic document or in a field such as an electronic commerce based on an information and communications network. For example, the electronic device 210 may perform a digital signature based on asymmetric cryptography. The digital signature may be used as a method for proving the validity of electronic data. For example, a person which sends electronic data may generate his or her signature, and a person who receives the electronic data may verify the signature to identify whether the signature is forged or falsified by another person. The blockchain may be used as a means capable of determining whether a creator who creates a transaction by means of such a digital signature is an owner who creates the transaction and has the right of access to an account. For example, in the operation of performing the digital signature, the electronic device may generate a key pair composed of a private key and a public key. At this time, the generated private key may be used to generate a signature, and the public key may be used to verify the signature. For example, the electronic device may deliver the public key to a reception side. The electronic device may encrypt electronic data using the private key. At this time, the generated ciphertext may be referred to as a digital signature. The electronic device may transmit the generated digital signature together with original data of the electronic data. An electronic device at a reception side, which verifies the digital signature, may decrypt the received digital signature using the public key, and may compare the decrypted and generated original data with the transmitted original data to identify whether the pieces of original data are the same as each other. At this time, when the decrypted data and the original data are the same as each other, the electronic device at the reception side may determine that the electronic data is not forged or falsified and is generated by an owner of the public key.

The electronic device 210 may have a need to generate a key used to perform a digital signature. The electronic device 210 may generate a key used to perform a digital signature based on a root key value. For example, the electronic device may generate a private key used to perform a digital signature using a hash function from a root key value and may generate a public key making up a key pair with the private key. The root key value may include, for example, a seed value (e.g., a root seed) or mnemonic information for obtaining the seed value.

Another type of address may be generated according to a type of a wallet of the blockchain. For example, in case of deterministic wallets, many keys may be generated from one root seed. In case of hierarchical deterministic wallets among types of deterministic wallets, various addresses may be generated based on keys generated from one seed. A mnemonic word sequence may be used as a root seed. Mnemonic code words may be defined by the BIP-39 standard. The mnemonic code words may generate a seed from English words arranged in order. A mnemonic code word string may generally be composed of 12 to 24 words and may generate a seed based on mnemonic words easily accessible by users, because it is difficult for general users to memorize a seed value. For example, when a mnemonic word is input through a library, BIP-39 may provide a function of generating a private key. An example about mnemonic words, a BIP-39 library, and a root seed may be illustrated as Table 1 below.

TABLE 1

| Mnemonic Words | "test tree pig cotton shin apple vast jun love ho purchase forever" |
|---|---|
| BIP-39 Library | Mnemonic(words).toHDPrivateKey( ) |
| Root Seed | FCCF1AB3329FD5DA3DA9577511F8F137 |

The electronic device 210 may recover and generate a private key anytime using the mnemonic words. When a mnemonic word is leaked, because hackers are able to recover a private key and steal assets from a blockchain account, a blockchain user has a need to separately manage the mnemonic word.

The electronic device 210 may derive a private key and a public key by means of the generated root seed. For example, according to the BIP-32 standard, the electronic device 210 may obtain a value by hashing the generated root seed value by means of a specific algorithm function (e.g., HMAC-SHA512) and may extract a private key from the obtained hash value. For example, the electronic device 210 may use left 256 bits in a 512-bit hash value generated by means of HMAC-SHA512 as the private key and may obtain a public key using the generated private key. In the blockchain network 220, a transaction may be generated and verified using the digital signature. The digital signature may be assigned to each transaction based on the blockchain network 220. Nodes which participate in the blockchain network may store blockchain information. Transaction data including information about transactions may be stored in nodes in the blockchain. The transaction data may be stored together with the digital signature and the public key. Blockchain network participants may verify all transactions previously stored in the block as well as a current transaction. By verifying the digital signature of the transaction, whether contents of transaction data are forged or falsified may be identified. Furthermore, whether a transaction is performed by a legitimate owner of cryptocurrency of the blockchain may be determined.

The electronic device 210 may include a display 211 (e.g., a display device 160 of FIG. 1), a communication circuit 212 (e.g., a communication module 190 of FIG. 1), a processor 213 (e.g., a processor 120 of FIG. 1), and a memory 214 (e.g., a memory 130 of FIG. 1). The memory 214 may store instructions, when executed, causing the processor 213 to perform an operation of the electronic device 210. The processor 213 may control a component (e.g., the display 211 or the communication circuit 212) of the electronic device 210, which is connected with the processor 213. In the disclosure, an operation of the electronic device (e.g., the electronic device 101 of FIG. 1 or the electronic device 210 of FIG. 2) may be understood as being performed as the processor (e.g., the processor 120 of FIG. 1 or the processor 213 of FIG. 2) executes instructions stored in the memory (e.g., the memory 130 of FIG. 1 or the memory 214 of FIG. 2).

The memory 214 may store a blockchain wallet 215 for processing transaction data for a blockchain network 220. For example, the processor 213 may run the blockchain wallet 215 and may receive a user input generating a blockchain transaction event. In response to the user input, the processor 213 may generate transaction data using the blockchain wallet 215 and may perform a digital signature. The memory 214 may have key storage 216 which stores a key value (e.g., a seed value or mnemonic information) for performing a digital signature. According to an embodiment, the electronic device 210 may encrypt a key value for security and may store the encrypted key value in the key storage 216. Alternatively, according to another embodiment, the key storage 216 may be configured based on a separate storage medium (e.g., a secure memory or a secure element) with excellent security.

The processor 213 may divide a key value stored in the key storage 216 to generate at least one distributed key. For example, the processor 213 may determine a total quantity of the at least one distributed key and may divide the key value into the determined total quantity of distributed keys using a distributed storage algorithm (e.g., the Shamir's sharing secret scheme (SSSS) algorithm).

According to an embodiment, the processor 213 may obtain device information about the at least one external electronic device 240 to determine the total quantity of distributed keys. The processor 213 may obtain device information stored in the memory 214. Alternatively, the processor 213 may receive device information through the communication circuit 212 from a server 230. Alternatively, the processor 213 may receive device information from the at least one external electronic device 240 directly connected (e.g., wired communication or wireless communication such as Bluetooth™) with the electronic device 210 to be communicable.

The at least one external electronic device 240 may be a device capable of storing at least one distributed key. For example, the external electronic device 240 may include a wearable device 241, a server 242, an Internet of things (IoT) device 243, or a mobile device 244.

The device information may refer to information indicating a feature of each of the at least one external electronic device 240. For example, the device information may include at least one of device type information, a device identifier, a user account, device specification information, device position information, and a device name for each of the at least one external electronic device 240.

The device type information may be information indicating that the at least one external electronic device 240 belongs to any type (e.g., an IoT device, a wearable device, a fixed device, a mobile device, a shared device, a personal device, or the like). The device identifier may be information for identifying the at least one external electronic device 240, for example, a media access control (MAC) address, an international mobile equipment identity, a phone number, or a serial number. The user account may be an account for a user of the at least one external electronic device 240. For example, the user account may be an account for logging in to the server 230 or information (e.g., a nickname, a phone number, or a user identifier (ID)) associated with the account for logging in to the server 230. The device specification information may be information indicating performance of a device of the at least one external electronic device 240 or the external electronic device 240. For example, the device specification information may include information about whether the at least one external electronic device 240 has a trusted execution environment (TEE), whether the at least one external electronic device 240 has a display, whether the at least one external electronic device 240 has an input device, whether the at least one external electronic device 240 has an encryption function, performance of the processor of the at least one external electronic device 240, or whether the at least one external electronic device 240 has a biometric sensor. The device position information refers to information (e.g., global positioning system (GPS) coordinates or relative position information) indicating a position of the device. The device name may refer to a model name of the device or a name set by a user to identify the at least one external electronic device 240.

The processor 213 may determine the total quantity of the at least one distributed key based on the device information. According to an embodiment, the processor 213 may select at least one distributed storage device to store a distributed key based on the device information from the at least one external electronic device 240. The processor 213 may determine a total quantity of distributed keys based on the at least one distributed storage device determined based on the device information. For example, when the at least one selected distributed storage device is five, the processor 213 may determine the total quantity of the at least one distributed key as five. For another example, when the at least one selected distributed storage device is five, the processor 213 may determine the total quantity of the distributed keys as a natural number greater than five such that the distributed keys are duplicated and stored (i.e., such that the at least one distributed key is stored in two or more distributed storage devices).

According to an embodiment, the processor 213 may calculate a score for each of the at least one external electronic device 240 based on the device information. The processor 213 may select at least one distributed storage device to store at least one distributed key among the at least one external electronic device 240 based on the calculated score. According to an embodiment, the processor 213 may select the external electronic device 240 where the calculated score is greater than or equal to a specified value as a distributed storage device. According to another embodiment, the processor 213 may output a device list of the at least one external electronic device 240, which is generated based on the device information, through the display 211. The processor 213 may receive a user input selecting at least some of the at least one external electronic device 240 from the device list through an input device (not shown) (e.g., an input device 150 of FIG. 1 or the display 211 having a touch circuit). The processor 213 may select the selected device as at least one distributed storage device.

According to an embodiment, the processor 213 may select the external electronic device 240 as a distributed storage device based on reliability information of the external electronic device 240. According to an embodiment, the processor 213 may determine reliability information based on a history about whether the external electronic device 240 is previously used as a distributed storage device. For example, the processor 213 may determine whether the external electronic device 240 is previously used as a distributed storage device or is used as another reliable user (e.g., a family member, a relative, or a friend) except for the user. The processor 213 may obtain reliability information from a server outside the electronic device. For example, the server may determine and transmit whether the external electronic device 240 is hacked, whether there is stability of the external electronic device 240, or whether there is an S/W security upgrade of the external electronic device 240 to the electronic device 210. The processor 213 may determine the external electronic device 240 as a distributed storage device based on the information obtained from the server. For example, when a new hacking threat for IOT devices is discovered, the processor 213 may obtain the information through the server and may exclude the IOT device, the hacking threat of which is discovered, from the distributed storage device. According to an embodiment, the processor 213 may obtain reliability information about the external electronic device 240 from another electronic device (e.g., server 108). For example, the electronic device 101 may obtain pieces of information about whether the external electronic device 240 may be determined as a distributed storage device (e.g., device information, information about whether the external electronic device 240 is previously determined as a distributed storage device, or hacking possibility information) from the other electronic device (e.g., server 108) connected with the electronic device 101 through a communication module (e.g., a wired communication module 194 or a wireless communication module 192). For example, information about the external electronic device 240 usable as a distributed storage device may be obtained through an electronic device used by a reliable user (e.g., a family member, a friend, or a relative).

The processor 213 may transmit at least one distributed key generated based on the determined total quantity to the external electronic device 240 determined as the distributed storage device through the communication circuit 212. According to an embodiment, when the external electronic device 240 is a device directly connected with the electronic device 210, the processor 213 may directly transmit the distributed key to the external electronic device 240 through the communication circuit 212. After the distributed key is stored in the external electronic device 240, the processor 213 may store device identification information for identifying the external electronic device 240 in the memory 214 or may transmit the device identification information to the server 230 to store the device identification information in the server 230.

The device identification information may refer to information for uniquely identifying the electronic device 210 or the external electronic device 240. For example, the device identification information may include a MAC address or a device ID of the electronic device 210 or the external electronic device 240.

According to another embodiment, the processor 213 may request the server 230 to store a distributed key. In response to the request, the server 230 may store the distributed key in the external electronic device 240. The server 230 may store device identification information about the external electronic device which stores the distributed key.

According to another embodiment, the processor 213 may store a distributed key in the blockchain network 220 rather than the external electronic device 240. For example, the operation of storing the distributed key in the blockchain network 220 may include an operation of generating a transaction including distributed keys and including and storing the transaction in a block on the blockchain. Information about the distributed keys stored on the blockchain may be stored in nodes which participate in a blockchain node. The electronic device 210 may access the information about the distributed keys based on an address value for a blockchain transaction. When storing the distributed key in the blockchain network 220, the processor 213 may store a transaction ID, capable of identifying a position where the distributed key is stored, as device identification information in the memory 214 or the server 230.

According to an embodiment, the processor 213 may encrypt the generated distributed key before transmitting the distributed key, such that the encrypted distributed key is transmitted. The processor 213 may encrypt the distributed key using an encryption key stored only in the electronic device 210. However, when using the encryption key stored only in the electronic device 210 and when the electronic device 210 is damaged or lost, it may not decrypt the distributed key. Thus, the processor 213 according to an embodiment may encrypt a distributed key based on information capable of being provided from only a user (e.g., biometric information or personal identification information) or information only the electronic device 210 and the server 230 are able to know (hereinafter, an encryption code). When encrypting the distributed key based on the information of the electronic device 210 and the server 230, the electronic device 210 or another electronic device, which wants to recover the key value, may request the server 230 to receive information for decrypting the distributed key.

According to an embodiment, when the root seed is distributed and stored, the processor 213 may recover the root seed, may generate a private key from the recovered root seed, and may perform a digital signature on blockchain transaction data to be transmitted to the blockchain network 220 using the generated private key.

According to an embodiment, when the mnemonic word is distributed and stored, the processor 213 may recover the mnemonic word, may generate a root seed from the recovered mnemonic word, may generate a private key from the recovered root seed, and may perform a digital signature on blockchain transaction data to be transmitted to the blockchain network 220 using the generated private key.

According to an embodiment, when the private key is distributed and stored, the processor 213 may recover the private key and may perform a digital signature on blockchain transaction data to be transmitted to the blockchain network 220 using the recovered private key. After performing the digital signature on the blockchain transaction data, the processor 213 may transmit the digitally signed blockchain transaction data to the blockchain network 220 through the communication circuit 212.

The server 230 may manage information about the at least one external electronic device 240 associated with a user account based on the user account which logs in to the server 230 through the electronic device 210. For example, the server 230 may map and manage device information about the IoT device 243 which is accessible to the user account based on the user account or is determined as a distributed storage device. According to an embodiment, the server 230 may manage information about the external electronic device 240 through another server. For example, the IoT device 243 may be controlled by accessing an IoT server (not shown). Alternatively, the server 230 may obtain and transmit information about an operation of the IoT device 243 or information about a state of the IoT device 243 to the electronic device 210 through the IoT server (not shown). The server 230 may be configured, including a memory (not shown), a communication circuit (not shown), and a processor (not shown) connected with the memory and the communication circuit.

Figure 3:
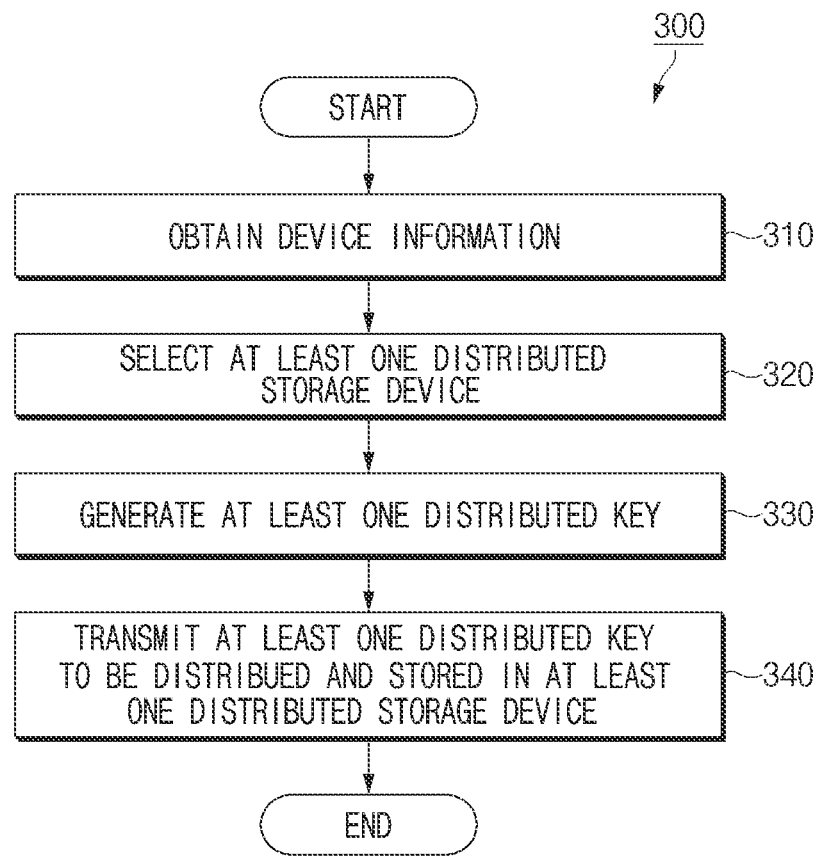
FIG. 3 is a flowchart illustrating a process where an electronic device stores a key value in distributed storage device, according to an embodiment of the disclosure.

FIG. 3 is a flowchart illustrating a process where an electronic device (e.g., an electronic device of FIG. 1 or an electronic device of FIG. 2) stores a key value (e.g., a seed value or mnemonic information) in a distributed storage device, according to an embodiment of the disclosure.

Referring to FIG. 3 depicting a process 300, in operation 310, an electronic device (e.g., a processor 213) may obtain device information about at least one external electronic device (e.g., an external electronic device 240 of FIG. 2). The device information may include at least one of device type information, a device identifier, a user account, device specification information, device position information, and a device name for each of external electronics. According to an embodiment, the electronic device may obtain device information from a server (e.g., a server 230 of FIG. 2). Alternatively, the electronic device may obtain device information stored in the electronic device or may directly receive device information from an external electronic device connected with the electronic device.

In operation 320, the electronic device (e.g., the processor 213) may select at least one distributed storage device to store a distributed key among the at least one external electronic device based on the device information. According to an embodiment, the electronic device may display a device list such that at least a portion of the device information is displayed. The electronic device may provide the device list to a user and may receive a user input for selecting a distributed storage device. The electronic device may select at least one distributed storage device, in response to the user input.

According to an embodiment, the electronic device may determine a priority for the at least one external electronic device based on the device information. The electronic device may assign a weight to each of the at least one external electronic device based on the device information and may calculate a score for determining a priority based on the assigned weight. For example, the electronic device may assign a high weight when the external electronic device is a device owned by an individual, for example, a wearable device, based on the device type information included in the device information. For another example, when the device specification information included in the device information has an input device or when a supportable encryption level is high, the electronic device may assign a high weight.

The electronic device may display a device list based on the determined priority. For example, the electronic device may display the device list where the device information is arranged in an order of priorities. For another example, the electronic device may display device information about an external electronic device with a high priority to be distinguished from device information about another external electronic device. For another example, the electronic device may display an indicator to identify an external electronic device with a high priority.

According to another embodiment, the electronic device may automatically select at least some having device information meeting a specified condition among the at least one external electronic device as at least one distributed storage device. For example, the electronic device may select a device, indicating that the device information has a storage space and a personal device of a user or indicating that an encryption input is possible, as a distributed storage device. For another example, the electronic device may determine a priority for each of the at least one external electronic device and may select at least one device with a high priority as at least one distributed storage device.

According to an embodiment, the electronic device may use reliability information about an external electronic device to select the external electronic device as a distributed storage device. According to an embodiment, the reliability information may include information about whether there is a history where another electronic device is previously used as a distributed storage device, vulnerability information about hacking, information about whether security software is upgraded, a hacking history, or whether there is a storage area with enhanced security, with respect to the external electronic device. According to an embodiment, the reliability information may be obtained through another electronic device outside the electronic device or a server.

In operation 330, the electronic device (e.g., the processor 213) may generate at least one distributed key to divide a key value. According to an embodiment, the electronic device may determine a total quantity of the at least one distributed key depending on the at least one distributed storage device selected based on the device information. The electronic device may generate at least one distributed key based on the determined total quantity. For example, when three external electronic devices are selected as distributed storage devices, the electronic device may divide the key value into three distributed keys.

According to an embodiment, the electronic device may determine a storage quantity of distributed keys to be stored in each of the at least one distributed storage device selected based on the device information. For example, the electronic device may store more distributed keys in a distributed storage device with a higher security level. In operation 320, the electronic device may further consider a storage quantity of distributed keys to be stored in each distributed storage device to generate a distributed key. For example, when three external electronic devices are selected as distributed storage devices and when the storage quantities of the respective distributed storage devices are 1, 3, and 2, the electronic device may divide the key value into six distributed keys.

In operation 340, the electronic device may transmit at least one distributed key to be distributed and stored in the at least one distributed storage device. According to an embodiment, when the storage quantity of distributed keys for the distributed storage device is determined, the distributed key may be transmitted to the distributed storage device according to the determined storage quantity.

Figure 4:
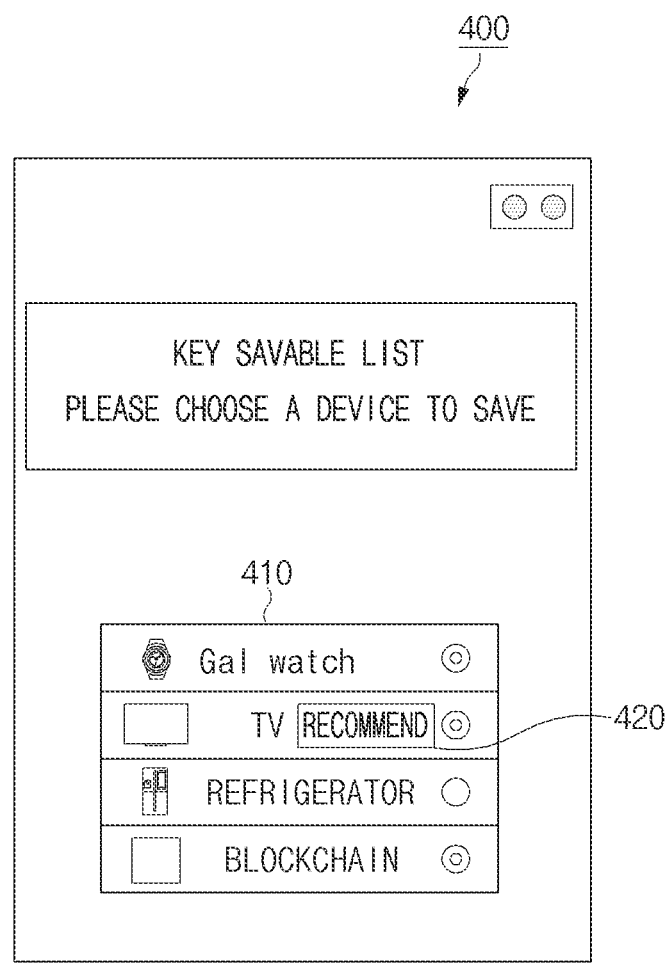
FIG. 4 illustrates an example of a screen including a device list of external electronic devices displayed by an electronic device, according to an embodiment of the disclosure.

FIG. 4 illustrates an example of a screen including a device list of external electronic devices (e.g., an external electronic device of FIG. 2) displayed by an electronic device (e.g., an electronic device of FIG. 1 or an electronic device of FIG. 2), according to an embodiment of the disclosure.

Referring to FIG. 4, an electronic device may display a screen 400 including a device list 410 of external electronic devices to select a distributed storage device to store a distributed key (e.g., operation 320 of FIG. 3). According to an embodiment, the device list 410 may be configured based on the priority determined for the external electronic device.

According to an embodiment, the electronic device may select at least one recommended device among the external electronic devices included in the device list 410 based on device information. For example, the electronic device may calculate a score for each external electronic device based on the device information and may select an external electronic device having a score of a threshold or more as a recommended device. The electronic device may output the screen 400 including an indicator 420 indicating a recommended device included in the device list 410. According to an embodiment, the electronic device may output a screen including the calculated score.

Figure 5:
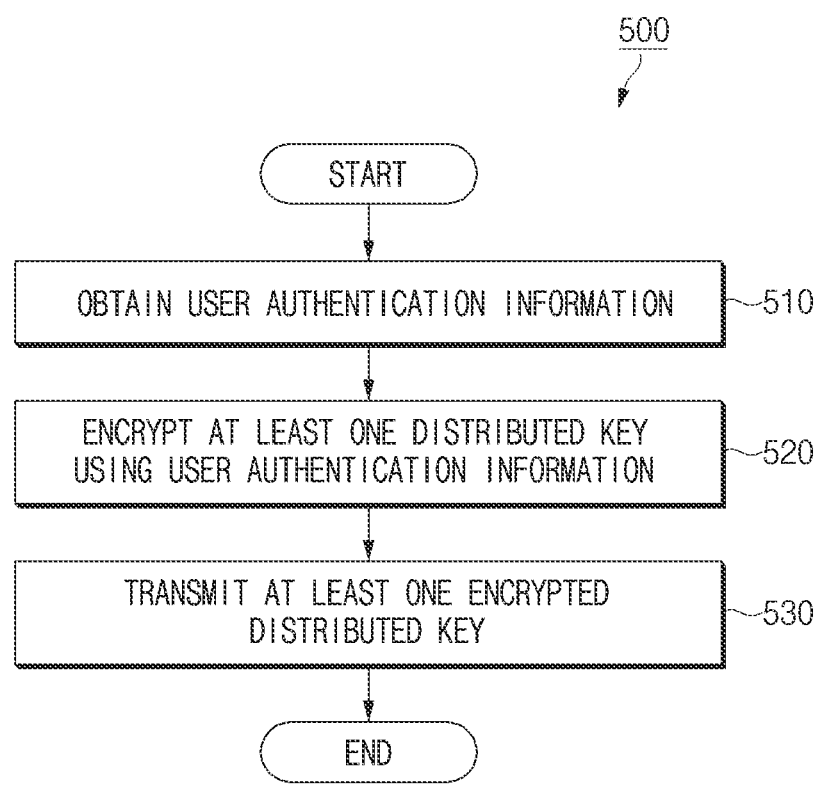
FIG. 5 is a flowchart illustrating a process where an electronic device transmits a distributed key encrypted based on user authentication information, according to an embodiment of the disclosure.

FIG. 5 is a flowchart illustrating a process where an electronic device (e.g., an electronic device of FIG. 1 or an electronic device of FIG. 2) transmits a distributed key encrypted based on user authentication information, according to an embodiment of the disclosure.

According to an embodiment, a process shown in FIG. 5 may be performed before an operation (e.g., operation 340 of FIG. 3) of transmitting a distributed key is performed or in a process where the operation (e.g., operation 340 of FIG. 3) of transmitting the distributed key is performed.

Referring to FIG. 5 depicting a process 500, in operation 510, an electronic device (e.g., a processor 213) may obtain user authentication information. The user authentication information may refer to information capable of identifying and authenticating a user of the electronic device. For example, the user authentication information may include a password, a personal identification number (PIN), or biometric information. The biometric information may include, for example, fingerprint information, iris information, genetic material information, or vein information. The user authentication information may be input through, for example, a touch screen display, another input device, or a sensor (e.g., a fingerprint sensor or an image sensor).

According to an embodiment, the electronic device may display a screen according to a type of user authentication information for encrypting at least one distributed key. For example, when at least one distributed storage device is selected based on the screen shown in FIG. 4, the electronic device may display a screen for receiving user authentication information.

For example, when the user authentication information is a personal identification number, the electronic device may display a screen for receiving a number. For another example, when the user authentication information is fingerprint information, the electronic device may display a screen requesting to input a fingerprint to a fingerprint sensor (e.g., a sensor module 176 of FIG. 1) of the electronic device.

In operation 520, the electronic device (e.g., a processor 213) may encrypt at least one distributed key (e.g., a distributed key generated in operation 330 of FIG. 3) using the obtained user authentication information. In operation 530, the electronic device (e.g., a processor 213) may transmit the at least one encrypted distributed key to at least one distributed storage device.

Figure 6:
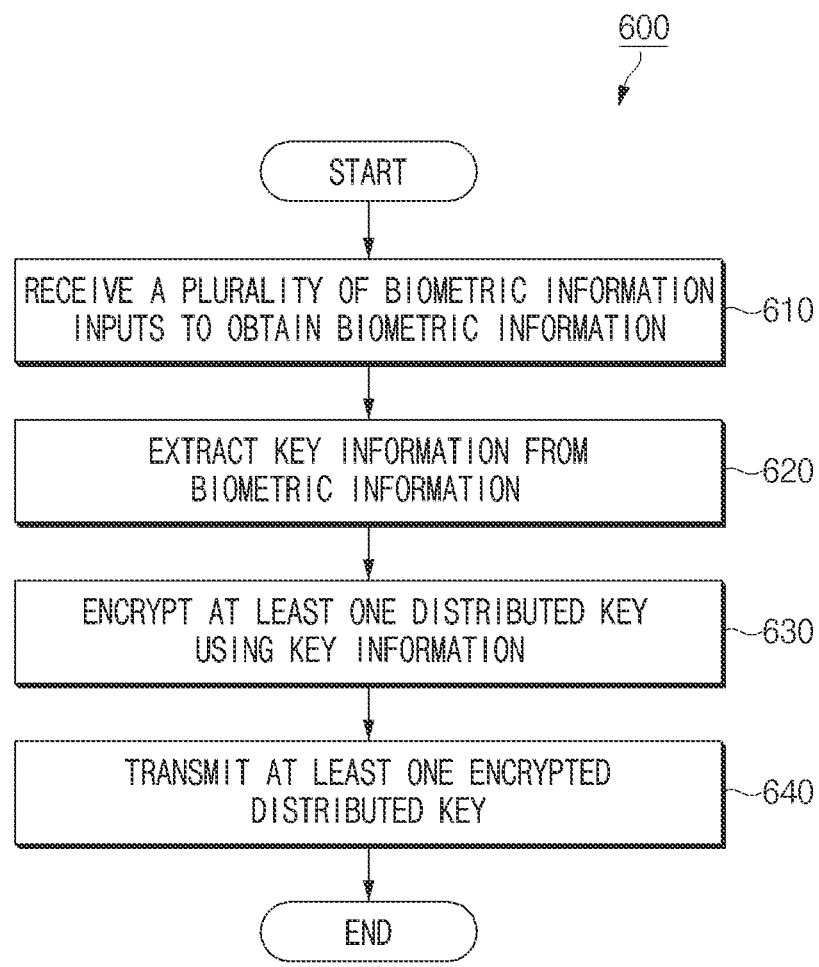
FIG. 6 is a flowchart illustrating a process where an electronic device transmits a distributed key encrypted based on biometric information, according to an embodiment of the disclosure.

FIG. 6 is a flowchart illustrating a process where an electronic device (e.g., an electronic device 101 of FIG. 1 or an electronic device 210 of FIG. 2) transmits a distributed key encrypted based on biometric information, according to an embodiment of the disclosure.

Referring to FIG. 6 depicting a process 600, in operation 610, an electronic device (e.g., a processor 213) may receive a plurality of biometric information inputs. For example, the electronic device may receive fingerprint information a plurality of times. The electronic device may obtain biometric information from the plurality of biometric information inputs.

In operation 620, the electronic device (e.g., the processor 213) may extract key information from the obtained biometric information. According to an embodiment, the key information may refer to information included in common in the biometric information input which is input a plurality of times. In other words, it may refer to information stably obtained among pieces of information included in the biometric information input.

In operation 630, the electronic device (e.g., the processor 213) may encrypt at least one distributed key using the key information. All pieces of biometric information may not be the same each other upon every input. Thus, when the distributed key is encrypted using all of pieces of input biometric information, the encrypted distributed key may not be decrypted using biometric information input to decrypt the distributed key. However, when the distributed key is encrypted using the key information, the distributed key may be decrypted using information of a portion corresponding to the key information among pieces of biometric information input upon decryption.

In operation 640, the electronic device (e.g., the processor 213) may transmit the at least encrypted distributed key to at least one distributed storage device.

Figure 7:
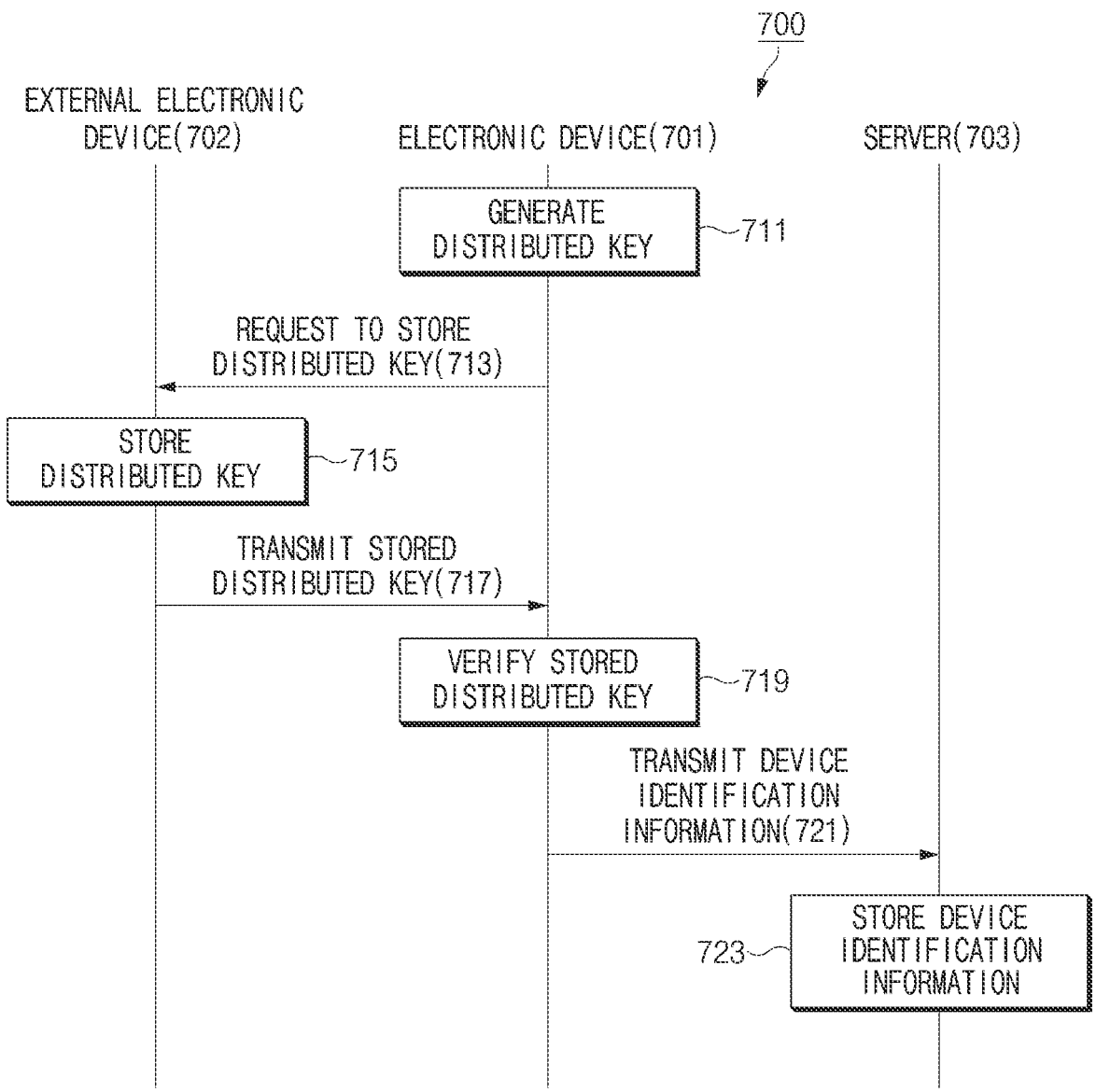
FIG. 7 is a signal sequence diagram illustrating a process of storing device identification information about an external electronic device which stores a distributed key in a server, according to an embodiment of the disclosure.

FIG. 7 is a signal sequence diagram illustrating a process of storing device identification information about an external electronic device 702 (e.g., an electronic device 102 of FIG. 1, an electronic device 104 of FIG. 1, or an external electronic device 240 of FIG. 2) which stores a distributed key in a server 703 (e.g., a server 108 of FIG. 1 or a server 230 of FIG. 2), according to an embodiment of the disclosure.

Referring to FIG. 7 depicting a process 700, in operation 711, an electronic device 701 (e.g., an electronic device 101 of FIG. 1 or an electronic device 210 of FIG. 2) (e.g., a processor 213) may generate at least one distributed key. In operation 713, the electronic device 701 (e.g., the processor 213) may transmit a distributed key storage request to the at least one external electronic device 702. According to an embodiment, the distributed key storage request may include at least one distributed key to be stored in the at least one external electronic device 702.

In operation 715, the at least one external electronic device 702 may store at least one distributed key received from the electronic device 701. In operation 717, the at least one external electronic device 702 may transmit the at least one stored distributed key to the electronic device 701. In operation 719, the electronic device 701 (e.g., the processor 213) may verify the distributed key stored in the at least one external electronic device 702. When the at least one distributed key received from the at least one external electronic device 702 is the same as the at least one distributed key transmitted in operation 713, the electronic device 701 may determine that the at least one distributed key is normally stored in the at least one external electronic device 702. According to another embodiment, operation 717 and operation 719 may be replaced with an operation where the external electronic device 702 transmits a notification message providing a notification that the distributed key is generated to the electronic device 701.

According to an embodiment, the at least one external electronic device 702 may set user authentication information about the distributed key depending on specifications of each external electronic device 702. For example, when having a touch screen panel, the external electronic device 702 may receive a password for authenticating a user through the touch screen panel. The external electronic device 702 may set the received password for the stored distributed key. For example, when receiving a request to transmit the distributed key, the external electronic device 702 may receive a password through the external electronic device 702 or the electronic device 701 and may transmit the distributed key only when the received password is matched with the set password.

When it is determined that the at least one distributed key is normally stored in the at least one external electronic device 702, in operation 721, the electronic device 701 (e.g., a communication circuit 212) may transmit device identification information about the at least one external electronic device 702 to a server 703.

According to an embodiment, when normally storing the distributed key, the external electronic device 702 may directly deliver the device identification information to the server 703. For example, when the external electronic device 702 is authenticated through authentication of the user and stores the distributed key, it may directly deliver device identification information to the server. According to an embodiment, the server 703 may directly obtain, store, and manage device identification information about storing the distributed key from the plurality of external electronic devices 702.

According to an embodiment, when the storage for the external electronic device 702 fails, failed information may be delivered to the server 703. The server 703 may manage reliability information about the external electronic device 702. When the distributed key is stored and when it fails in user authentication or when reliability of the external electronic device 702 is lowered because it repeatedly fails in user authentication, the external electronic device 702 may deliver contents about the failure to the electronic device 701. For example, when repeated failure occurs in the specific external electronic device 702, the server 703 may identify it and may deliver reliability information of the specific external electronic device 702 to related electronic devices.

In operation 723, the server 703 may store the device identification information. The device identification information may refer to information for identifying each external electronic device 702. For example, the device identification information may include at least one of device type information, a device identifier, or a device name of the at least one external electronic device 702. The device type information may refer to classification to which the external electronic device 702, such as an air conditioner, a wearable device, or a television, belongs. The device identifier may include, for example, a MAC address, an international mobile equipment identity (IMEI), a serial number, or a hardware ID. The device name may be a name set by the user when information about the external electronic device 702 is registered with the server 703. According to an embodiment, when receiving a request for device identification information based on a user account, to provide the device identification information, the server 703 may associate and store the device identification information with a user account logged in to the server 703 through the electronic device 701.

Figure 8:
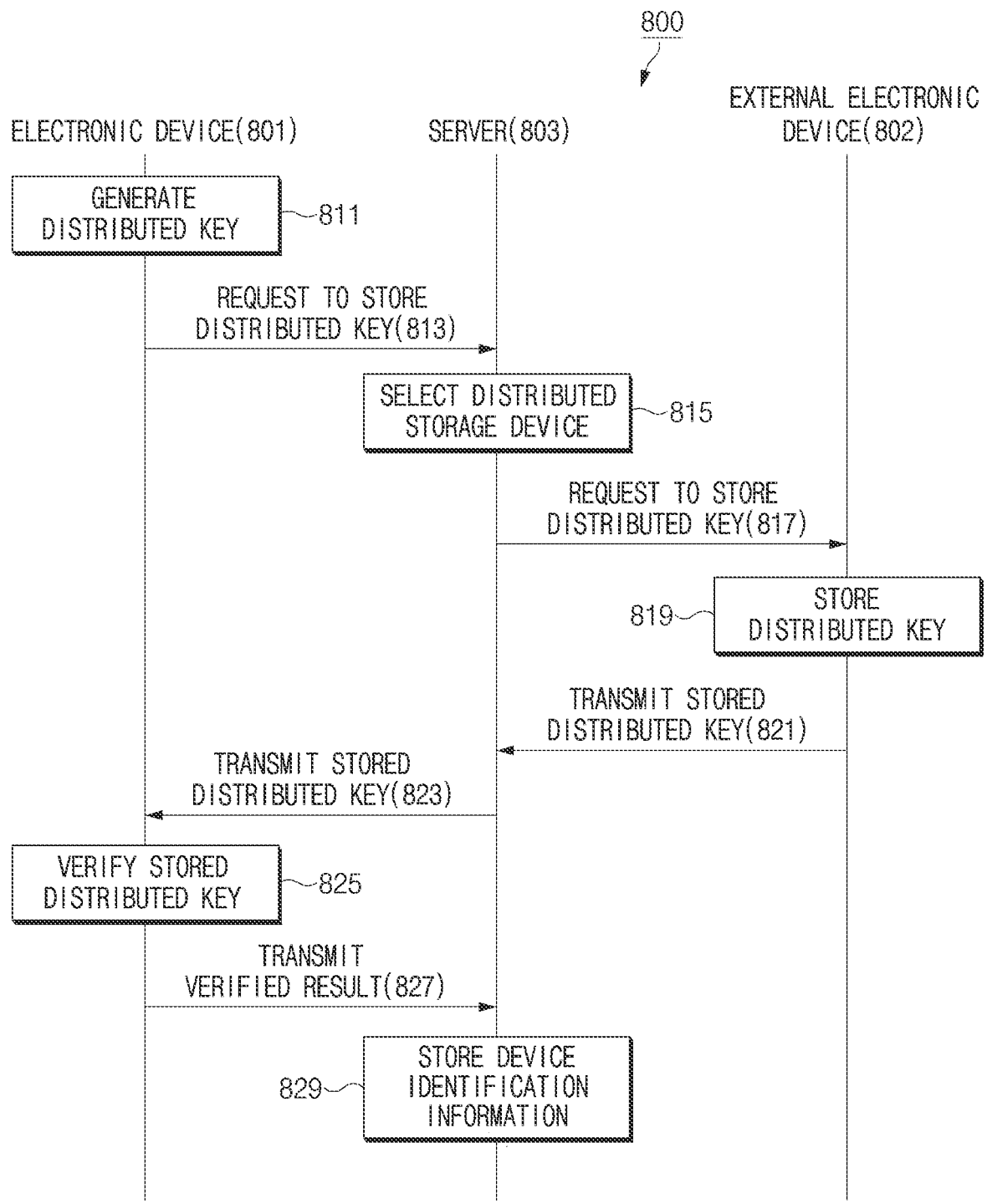
FIG. 8 is a signal sequence diagram illustrating a process of storing a distributed key in an external electronic device through a server, according to an embodiment of the disclosure.

FIG. 8 is a signal sequence diagram illustrating a process of storing a distributed key in an external electronic device (e.g., an electronic device 102 of FIG. 1, an electronic device 104 of FIG. 1, or an external electronic device 240 of FIG. 2) through a server 803 (e.g., a server 108 of FIG. 1 or a server 230 of FIG. 2), according to an embodiment of the disclosure.

Referring to FIG. 8 depicting a process 800, in operation 811, an electronic device 801 (e.g., an electronic device 101 of FIG. 1 or an electronic device 210 of FIG. 2) may generate at least one distributed key. In operation 813, the electronic device 801 may transmit a distributed key storage request to the server 803. According to an embodiment, the distributed key storage request may include at least one distributed key to be stored in at least one external electronic device 802.

Receiving the distributed key storage request, in operation 815, the server 803 may determine at least one distributed storage device to store a distributed key. For example, in operation 815, the server 803 may obtain information about at least one distributed storage device selected through operation 310 and operation 320 of FIG. 3 from the electronic device 801. For another example, the server 803 may determine priorities for external electronic devices based on device information about the external electronic devices. The server 803 may select distributed storage devices of a quantity required to store a distributed key in an order where the determined priorities are high.

In operation 817, the server 803 may transmit the distributed key storage request to the at least one external electronic device 802 selected as a distributed storage device. Receiving the distributed key storage request, in operation 819, the at least one external electronic device 802 may store the received distributed key. When the at least one external electronic device 802 transmits the stored distributed key in operation 821, in operation 823, the server 803 may deliver the distributed key to the electronic device 801.

In operation 825, the electronic device 801 may verify the distributed key stored in the at least one external electronic device 802. When the at least one distributed key received from the server 803 is the same as the at least one distributed key transmitted in operation 813, the electronic device 801 may determine that the at least one distributed key is normally stored in the at least one external electronic device 802. When it is determined that the one distributed key is normally stored, in operation 827, the electronic device 801 may transmit the verified result to the server 803.

According to another embodiment, operations 823, 825, and 827 may be replaced with an operation where the server 803 compares the distributed key received in operation 813 with the distributed key received in operation 821 to verify the distributed key stored in the at least one external electronic device 802. When it is verified that the stored distributed key is valid, the server 803 may transmit a notification message for providing a notification of the stored result to the electronic device 801.

According to another embodiment, operation 823, 825 and 827 may be replaced with an operation where the external electronic device 802 transmits a notification message providing a notification that the distributed key is generated to the electronic device 801.

According to another embodiment, operations 817 to 825 may be replaced with an operation where the electronic device 801 performs operations 713 to 719 of FIG. 7 based on device identification information, when the server 803 transmit the device identification information about the external electronic device 802 selected as the distributed storage device to the electronic device 801.

In operation 829, the server 803 may store device identification information about the at least one external electronic device 802 which stores the distributed key.

According to an embodiment, in operations 821 and 823, the distributed key may be transmitted in an encrypted state. The electronic device 801 may decrypt and verify the encrypted distributed key.

According to an embodiment, operation 821, 823, 825, and 827 may be replaced with an operation where the external electronic device 802 verifies the stored distributed key and transmits the verified result to the server 803.

Various embodiments disclosed in the specification should not be independent of each other, and a plurality of embodiments are combined and used. For example, the electronic device (e.g., the electronic device 101 of FIG. 1 or the electronic device 210 of FIG. 2) may store a portion of the distributed key in an external electronic device directly connected with the electronic device (e.g., a wearable device connected through short range wireless communication) through a process 700 shown in FIG. 7 and may store the rest of the distributed key in an external electronic device (e.g., an IoT device) connected through the server through the process 800 shown in FIG. 8.

Figure 9:
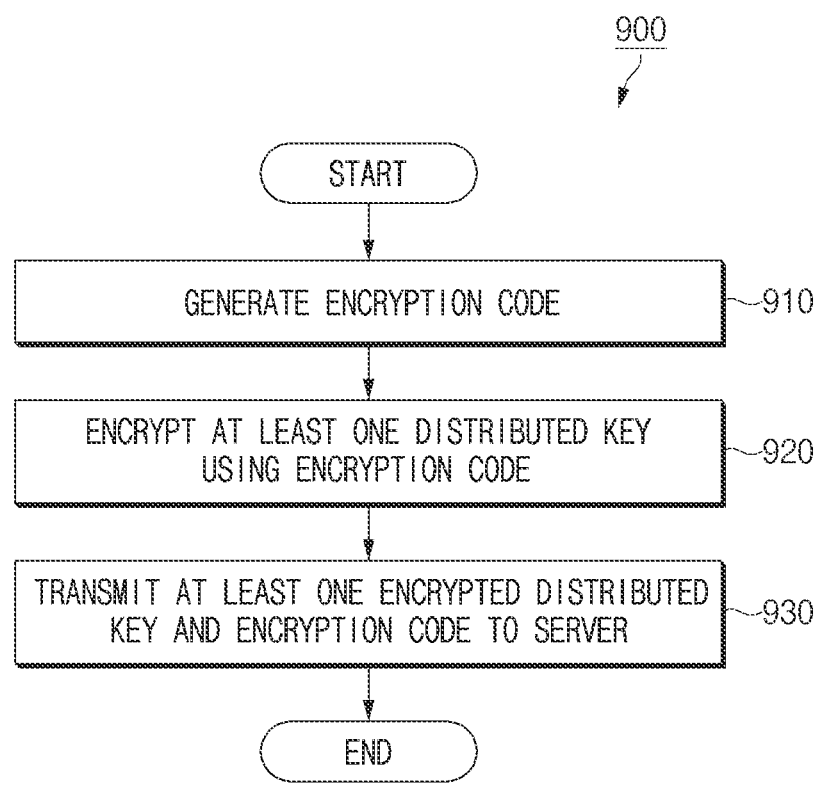
FIG. 9 is a flowchart illustrating a process where an electronic device transmits an encryption code for recovering a key value to a server, according to an embodiment of the disclosure.

FIG. 9 is a flowchart illustrating a process where an electronic device (e.g., an electronic device of FIG. 1 or an electronic device of FIG. 2) transmits an encryption code for recovering a key value to a server, according to an embodiment of the disclosure.

According to an embodiment, before performing an operation (e.g., operation 340 of FIG. 3) of transmitting at least one distributed key to at least one distributed storage device, in operation 910, the electronic device (e.g., a processor 213) may generate an encryption code. The encryption code may be generated in various methods according to an embodiment. For example, a random number generated by the electronic device may be used as the encryption code.

Referring to FIG. 9 depicting process 900, in operation 920, the electronic device (e.g., the processor 213) may encrypt at least one distributed key using the generated encryption code. In operation 930, the electronic device (e.g., the processor 213) may transmit the at least one encrypted distributed key together with the encryption code to a server (e.g., a server 108 of FIG. 1 or a server 230 of FIG. 2). Receiving the distributed key, the server may associate and store the encryption code with a user account of the electronic device. The encryption code stored in the server may be provided, when the electronic device attempts to decrypt the distributed key.

Figure 10:
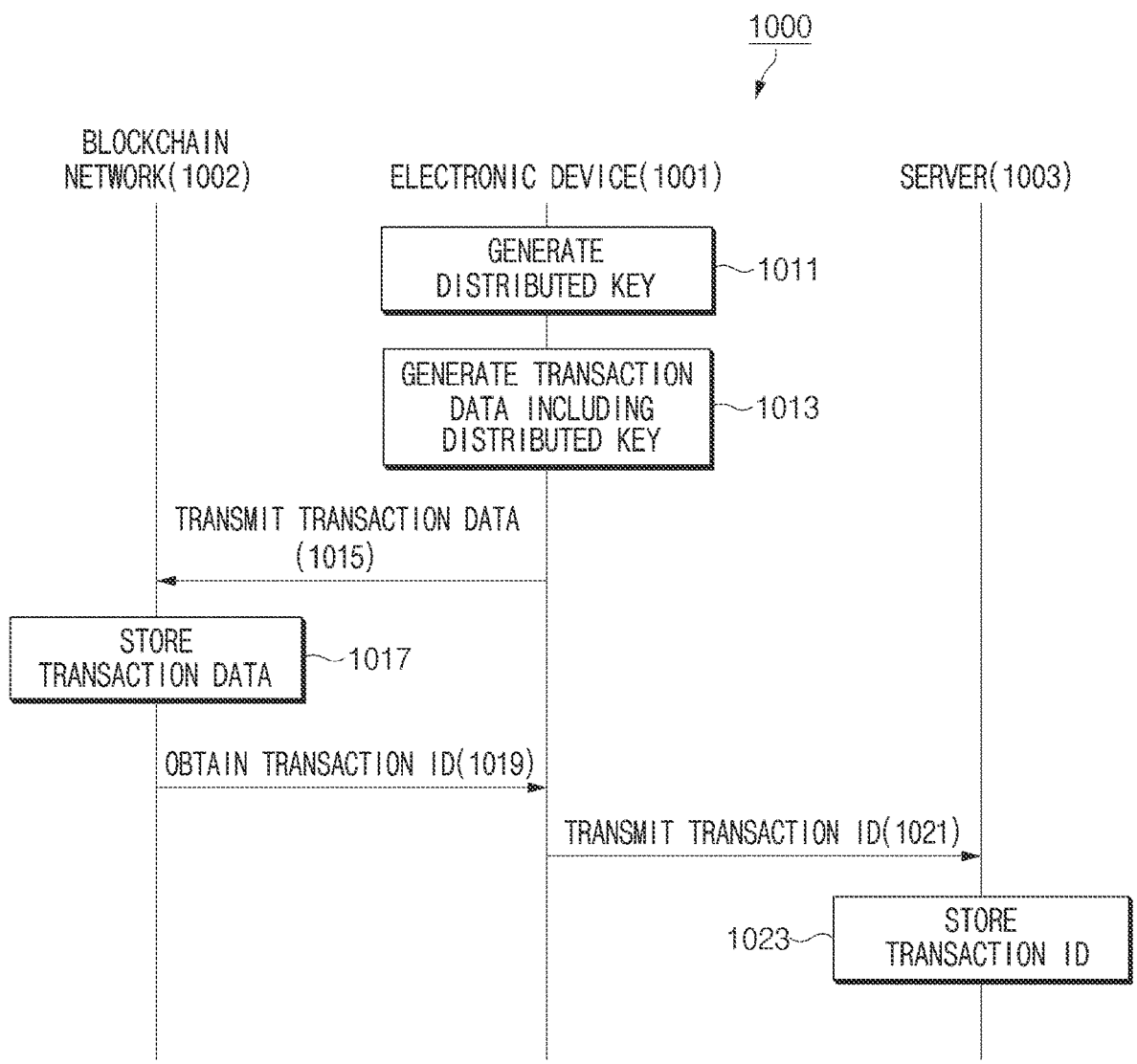
FIG. 10 is a signal sequence diagram illustrating a process where an electronic device stores a distributed key in a blockchain network, according to an embodiment of the disclosure.

FIG. 10 is a signal sequence diagram illustrating a process where an electronic device (e.g., an electronic device of FIG. 1 or an electronic device of FIG. 2) stores a distributed key in a blockchain network, according to an embodiment of the disclosure.

Referring to FIG. 10 depicting a process 1000, in operation 1011, an electronic device 1001 may generate at least one distributed key. The electronic device 1001 (e.g., a processor 213) may determine the number of transactions for storing the distributed key and may generate a distributed key depending on the number of transactions. For example, five distributed keys may be distributed through five transactions to be stored over a blockchain network. According to an embodiment, a plurality of distributed keys may be stored together in one transaction. For example, ten distributed keys may be generated and the respective distributed keys may be separated into two to be included and stored in five transactions. In operation 1013, the electronic device 1001 may generate transaction data including at least one distributed key to be stored in the at least one blockchain network 1002. For example, a transaction corresponding to the number of distributed keys may be generated. When five distributed keys are generated, the distributed keys may be distributed and stored in transaction data of five transactions. Because the recorded data is released due to the nature of blockchain technology among data stored in the blockchain network 1002, in operation 1013, the electronic device 1101 may encrypt and include the distributed key in transaction data.

In operation 1015, the electronic device 1001 may transmit the generated transaction data to the at least one blockchain network 1002. When the transaction data is stored in a node of the blockchain network in operation 1017, in operation 1019, the electronic device 1001 may obtain a transaction ID including information about a position where the transaction data is stored. The electronic device 1001 may read transaction data using the obtained transaction ID, may obtain a distributed key from the transaction data, and may verify the distributed key stored in the blockchain network 1002.

In operation 1021, the electronic device 1001 may transmit the transaction ID, rather than device identification information identifying the external electronic device which stores the distributed key, to a server 1003 (e.g., a server 108 of FIG. 1 or a server 230 of FIG. 2). In operation 1023, the server 1003 may store the received transaction ID. According to another embodiment, the electronic device 1001 may directly store the transaction ID in a storage medium (e.g., a memory 214) of the electronic device 1001.

FIG. 11 illustrates an example of device identification information stored in an electronic device or a server (e.g., a server of FIG. 1 or a server of FIG. 2), according to an embodiment of the disclosure.

Referring to FIG. 11, according to an embodiment, device identification information 1100 may include at least one of device type information 1110, a device ID 1120, a device name 1130, and a distributed key ID 1140.

The device type information 1110 may refer to information about a type of a device to which a distributed storage device belongs. The device ID 1120 may refer to unique information assigned to a device to identify the device. For example, the device ID 1120 may include a MAC address, an IMEI, a serial number, or a hardware ID. The device name may be a name set by a user when information about the distributed storage device is registered with the server. The distributed key ID 1140 may include information for identifying what a distributed key stored in the distributed storage device is.

When the device type information 1110 is a blockchain, the device ID 1120 may be a transaction ID.

However, the device identification information 1100 shown in FIG. 11 is to describe one example, and the device identification information 1100 may be configured differently from the example shown in FIG. 11.

Figure 12:
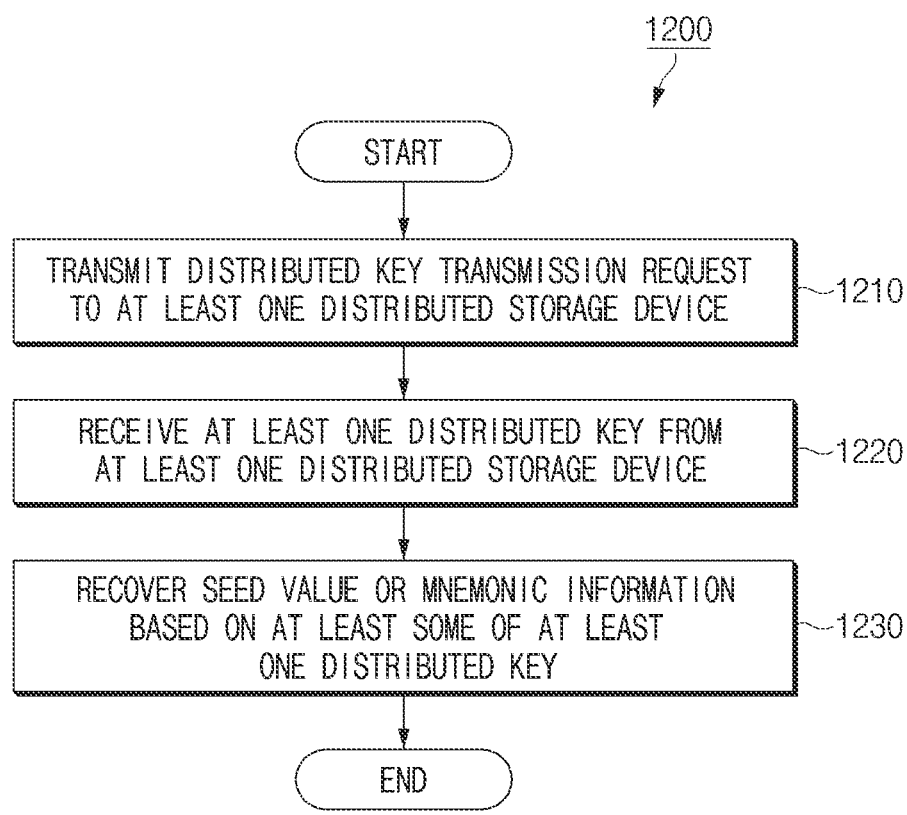
FIG. 12 is a flowchart illustrating a process where an electronic device recovers a key value, according to an embodiment of the disclosure.

FIG. 12 is a flowchart illustrating a process where an electronic device (e.g., an electronic device of FIG. 1 or an electronic device of FIG. 2) recovers a key value, according to an embodiment of the disclosure.

Referring to FIG. 12 depicting a process 1200, in operation 1210, an electronic device (e.g., a processor 213) may transmit a distributed key transmission request to at least one distributed storage device. According to an embodiment, the electronic device may identify at least one distributed storage device based on device identification information. According to an embodiment, the electronic device may obtain the device identification information from an external server. The at least one distributed storage device may be identified based on the obtained device identification information.

According to an embodiment, in operation 1210, the electronic device (e.g., the processor 213) may display a distributed storage device list on its display based on the device identification information to select at least one distributed storage device to transmit the distributed key transmission request. The electronic device may transmit a distributed key transmission request based on a user response selecting at least one distributed storage device from the distributed storage device list. According to another embodiment, the electronic device may transmit the distributed key transmission request to all distributed storage devices identified based on the device identification information.

In operation 1220, in response to the distributed key transmission request, the electronic device (e.g., the processor 213) may receive at least one distributed key from the at least one distributed storage device. Herein, the at least one received distributed key may be at least some of all distributed keys which divide and store a key value.

In operation 1230, the electronic device (e.g., the processor 213) may recover a key value (e.g., a seed value or mnemonic information) based on at least some of the at least one distributed key. For example, the electronic device may recover a key value from the at least one distributed key using a distributed storage algorithm (e.g., the Shamir's sharing secret scheme (SSSS) algorithm).

Figure 13:
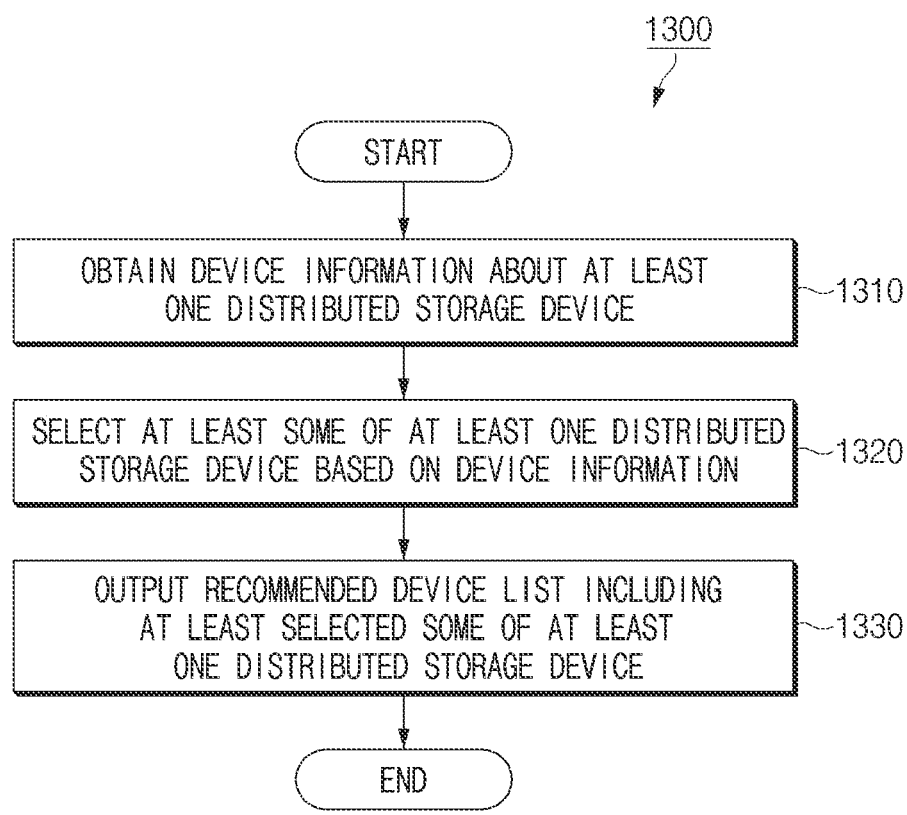
FIG. 13 is a flowchart illustrating a process where an electronic device selects a distributed storage device to obtain a distributed key, according to an embodiment of the disclosure.

FIG. 13 is a flowchart illustrating a process where an electronic device (e.g., an electronic device of FIG. 1 or an electronic device of FIG. 2) selects a distributed storage device to obtain a distributed key, according to an embodiment of the disclosure.

Referring to FIG. 13 depicting a process 1300, to transmit a distributed key transmission request to at least one distributed storage device (e.g., operation 1210 of FIG. 12), in operation 1310, the electronic device (e.g., a processor 213) according to an embodiment may obtain device information about the at least one distributed storage device. According to an embodiment, the device information may include device specification information, device type information, or device position information about at least one distributed storage device. According to an embodiment, the device information may include a transaction ID, when stored over a blockchain network.

In operation 1320, the electronic device (e.g., the processor 213) may select at least some of the at least one distributed storage device based on the device information. For example, the electronic device may first select a distributed storage device located close to a position of the electronic device. For another example, based on the device information, the electronic device may first select a distributed storage device determined that there is a function capable of authenticating a user. For another example, when the distributed storage device is determined as a device used by an individual rather a device used in common based on the device information, the electronic device may first select the corresponding distributed storage device.

In operation 1330, the electronic device (e.g., the processor 213) may output a recommended device list including the at least selected some of the at least one distributed storage device. The recommended device list may include all of the at least one selected distributed storage device, but may include only some of the at least one selected distributed storage device, which meet the minimum quantity of distributed keys required to recover a key value.

Figure 14:
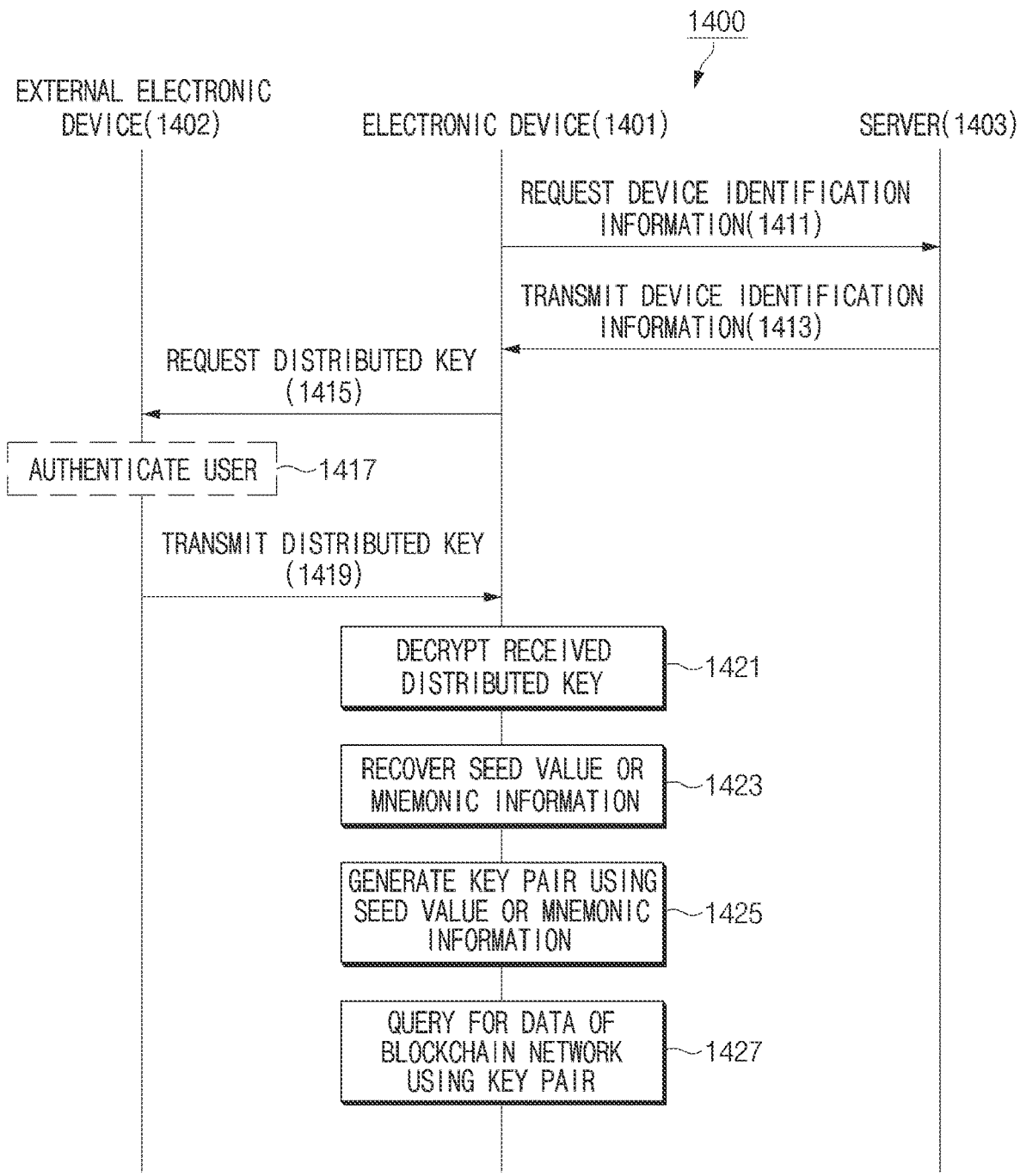
FIG. 14 is a signal sequence diagram illustrating a process of recovering a key value using device identification information stored in a server, according to an embodiment of the disclosure.

FIG. 14 is a signal sequence diagram illustrating a process of recovering a key value using device identification information stored in a server (e.g., a server of FIG. 1 or a server of FIG. 2), according to an embodiment of the disclosure.

Referring to FIG. 14 depicting a process 1400, when an event required to recover a seed value or mnemonic information which is a key value occurs in an electronic device 1401 (e.g., an electronic device 101 of FIG. 1 or an electronic device 210 of FIG. 2), in operation 1411, the electronic device 1401 may request a server 1403 to recover a distributed key. The event required to recover the seed value or the mnemonic information may mean, for example, that a user replaces his or her own device with the electronic device 1401 and inputs a user input corresponding to a command to request to recover a previously used seed value or mnemonic information (e.g., a touch input selecting the menu item "blockchain key value recovery") to the electronic device 1401.

When an external electronic device 1402 which stores a distributed key is a device capable of being directly connected with the electronic device 1401, in operation 1413, the electronic device 1410 may receive device identification information from the server 1403. In operation 1415, the electronic device 1410 may request a distributed key from the at least one external electronic device 1402 (e.g., an external electronic device 240 of FIG. 2) identified using the device identification information. According to an embodiment, the electronic device 1401 may select at least some of at least one external electronic device identified using the device identification information and may request a distributed key from the selected external electronic device 1402. The electronic device 1410 according to an embodiment may display a screen indicating a list of devices identified using the device identification information to select the external electronic device 1402.

According to an embodiment, prior to operation 1415, the electronic device 1401 may connect communication with the external electronic device 1402. For a communication connection, the server 1403 may transmit a command to broadcast an advertisement packet including connection information using short range wireless communication (e.g., Bluetooth™ Low Energy) to the external electronic device 1402. The external electronic device 1402 may transmit an advertisement packet and may operate like an access point. Receiving the advertisement packet, the electronic device 1401 may establish a communication connection (e.g., a Wi-Fi connection) to the external electronic device 1402 using connection information (e.g., a Wi-Fi service set identifier (SSID), an internet protocol (IP), a transmission control protocol (TCP)/user datagram protocol (UDP), socket information, a MAC address) included in the advertisement packet. According to an embodiment, the external electronic device 1402 may connect communication with a device which transmits an advertisement packet identical to information included in the device identification information. According to another embodiment, the electronic device 1401 may be sequentially connected with the plurality of external electronic device 1402 under control of the server 1403.

According to an embodiment, in operation 1411, the electronic device 1401 may be in a state where it is logged in to the server 1403 with a user account used when distributing and storing the distributed key. The server 1403 may provide the electronic device 1401 with the device identification information corresponding to a user account with which the electronic device 1401 is logged in.

According to an embodiment, when additional user authentication is required for the distributed key stored in the external electronic device 1402, in operation 1417, the external electronic device 1402 may perform an operation of authenticating a user. For example, the external electronic device 1402 may display a screen on a display of the external electronic device 1402 to receive user authentication information and may receive the user authentication information using the displayed screen. For another example, the external electronic device 1402 may request information for authenticating the user from the electronic device 1401 or may request the result of authenticating the user from the electronic device 1401. The external electronic device 1402 according to an embodiment may perform operation 1419, only when the user is authenticated as a legitimate user in operation 1417 (e.g., when the received user authentication information and registered user authentication information are matched with each other). However, in some cases (e.g., specifications of the external electronic device 1402 are unable to perform user authentication), operation 1417 may be omitted.

In operation 1419, the at least one external electronic device 1402 may transmit the at least one distributed key to the electronic device 1401. In operation 1421, the electronic device 1401 may decrypt the at least one received distributed key. According to an embodiment, when the at least one distributed key is encrypted based on the user authentication information, in operation 1421, the electronic device 1401 may receive the user authentication information. For example, when the user authentication information encrypting the at least one distributed key is fingerprint information, the electronic device 1401 may output a screen for receiving a fingerprint and may activate a fingerprint sensor (e.g., a sensor module 167 of FIG. 1). When the fingerprint information is obtained through the fingerprint sensor, the electronic device 1401 may extract a portion corresponding to key information from the fingerprint information. The electronic device 1401 may decrypt the at least one received distributed key based on the extracted information. The fingerprint information may be replaced with another piece of information such as iris information, vein information, DNA information, or a password. For another example, when the user authentication information encrypting the at least one distributed key is a personal identification number, the electronic device 1401 may receive the personal identification number and may decrypt the distributed key based on the received personal identification number.

According to another embodiment, in operation 1421, the electronic device 1401 may request an encryption code from the server 1403. The electronic device 1401 may receive the encryption code from the server 1403 in response to the encryption code request and may decrypt the at least one received distributed key based on the encryption code.

When the received distributed key is not encrypted, operation 1421 may be omitted.

In operation 1423, the electronic device 1401 may recover a seed value or mnemonic information which is a key value which is distributed and stored based on the at least one distributed key. The process of recovering the key value which is distributed and stored based on the at least one distributed key may be performed as the following process. According to an embodiment, the electronic device 1401 may use the Shamir's sharing secret scheme (SSSS) algorithm when decrypting the distributed key. According to an embodiment, data may be distributed into several pieces by means of the SSSS algorithm, and original data may be recovered when pieces of data distributed over a certain number are collected. The number (e.g., k) of distributed keys needed when performing decryption may be set, and original data may be recovered when distributed keys of a specific number or more are obtained.

When the seed value or the mnemonic information is recovered, in operation 1425, the electronic device 1401 may generate a key pair using the seed value or the mnemonic information. The process of generating the key pair may proceed as the following process. For example, the electronic device may use words included in a mnemonic and a salt value (e.g., a password received from the user) as factors to generate a 512-bit seed using a key stretching function. According to an embodiment, a certain (512-bit) value may be output using two factor values using the key stretching function (e.g., PBKDF2). For example, the key stretching function may repeatedly hash two factor values using a hash algorithm (e.g., HMAC-SHA512) and may generate a final output value as a root seed (a seed value). The electronic device may obtain a private key based on the generated root seed. For example, the root seed may generate a private key and a master chain code from a hash value generated through an HMAC-SHA512 algorithm function. 256 bits at the left of a 512-bit hashed value may be used as a private key, and 256 bits at the right of the 512-bit hashed value may be used as a chain code. The public key may be obtained from the private key using an elliptic curve function. As such, the private key, the public key, and the blockchain address may be derived through the root seed.

According to an embodiment, in case of a wallet (e.g., a digital wallet based on a deterministic layer structure), the electronic device may obtain a plurality of public keys corresponding to a plurality of addresses for a blockchain account from the root seed using a plurality of high definition (HD) paths. For example, the electronic device may obtain the plurality of public key from the root seed using the plurality of HD paths. Furthermore, the electronic device 1401 may obtain a plurality of blockchain addresses for the blockchain account, based on the plurality of public keys.

According to various embodiments, a method (e.g., with respect to three depths) for generating (or obtaining) an address of cryptocurrency using a root seed key generated based on standard BIP-39 and factor values of an HD path defined in standard BIP-44 may be performed based on standard BIP-32.

In the method for generating the address of the cryptocurrency, a factor value of a child key derivation function (CKD) corresponding to a next value may be continuously added, as depths are deep. For example, CKD(m,0) may be used when moving from 0 depth to 1 depth, and CKD(m.0,0) may be used when one depth deepens more (e.g., when moving from 1 depth to 2 depth). For example, an HMAC-SHA512 hash function may be used as the child key derivation (CKD) function. As such, when the distributed keys are recovered, all the private key, the public key, or the address of the account may be recovered to be used in the wallet.

In operation 1427, the electronic device 1401 may query a blockchain network (e.g., a blockchain network 220 of FIG. 2) using the generated key pair. When the seed value or the mnemonic information is normally recovered, the electronic device 1401 may normally obtain transaction data stored in the blockchain network. For example, the electronic device 1401 may receive the transaction data stored in the blockchain network and may obtain account information included in the transaction data using the public key included in the key pair.

Figure 15:
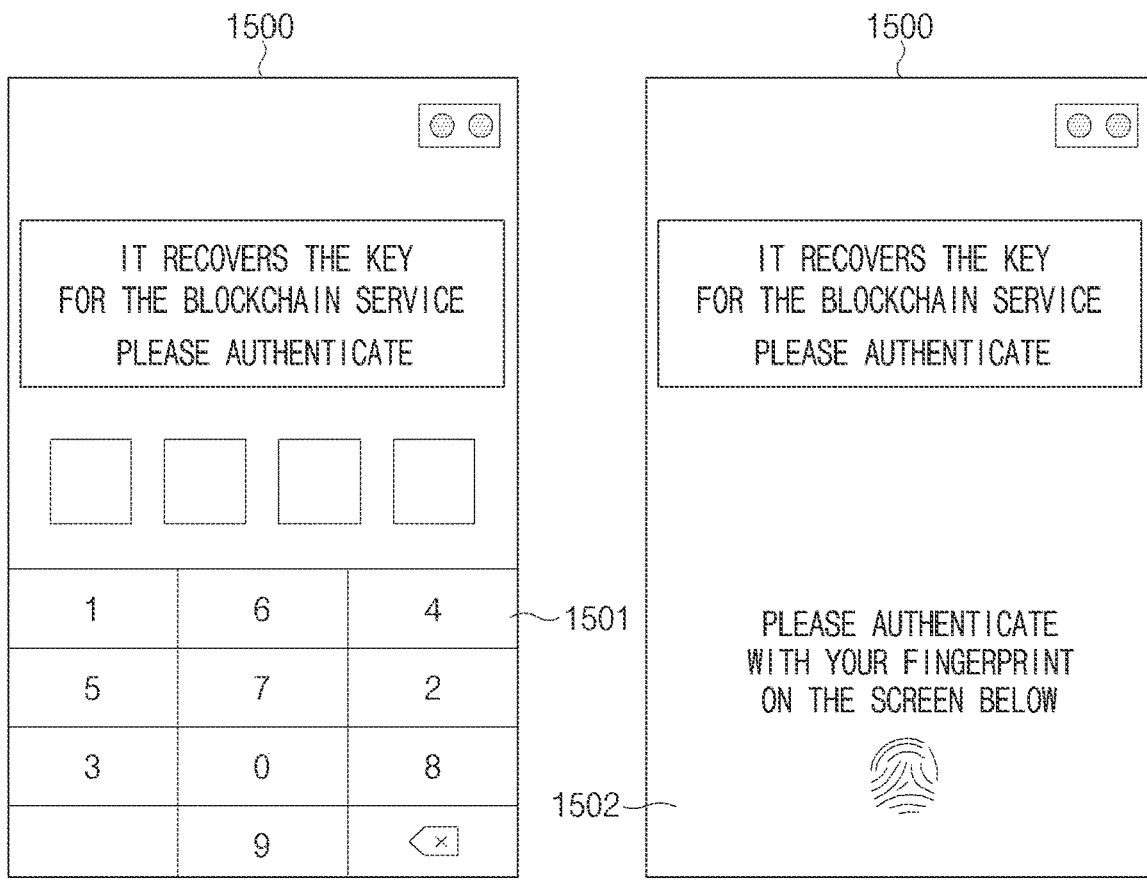
FIG. 15 illustrates an example of a screen displayed to receive user authentication information for recovering a key value by an electronic device or an external electronic device, according to an embodiment of the disclosure.
Figure 15:
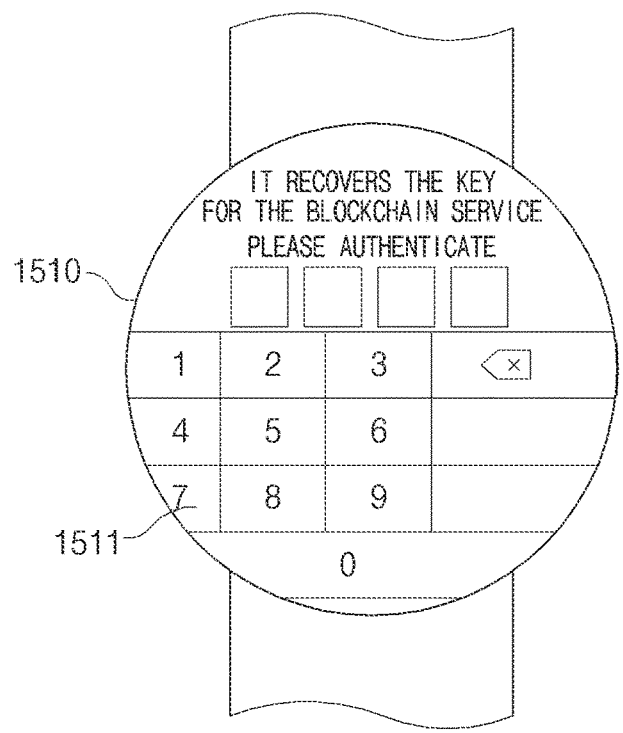

FIG. 15 illustrates an example of a screen displayed to receive user authentication information for recovering a key value by an electronic device (e.g., an electronic device of FIG. 1 or an electronic device of FIG. 2) or an external electronic device (e.g., an external electronic device of FIG. 2), according to an embodiment of the disclosure.

Referring to FIG. 15, for example, when receiving a personal identification number as user authentication information (e.g., when an external electronic device 1402 requests user authentication from an electronic device 1401 in operation 1417 of FIG. 14), the electronic device 1500 may output a screen including a keypad 1501 for receiving a number. For another example, when receiving fingerprint information as user authentication information (e.g., when the external electronic device 1402 requests user authentication from the electronic device 1401 in operation 1417 of FIG. 14), the electronic device 1500 may output a screen 1502 including a notification message associated with fingerprint information.

For another example, when receiving a personal identification number as user authentication information (e.g., when an external electronic device 1402 receives user authentication information in operation 1417 of FIG. 14), the external electronic device 1510 in the form of a smart watch may output a screen including a keypad 1511 for receiving a number on a display of the external electronic device 1510.

Figure 16:
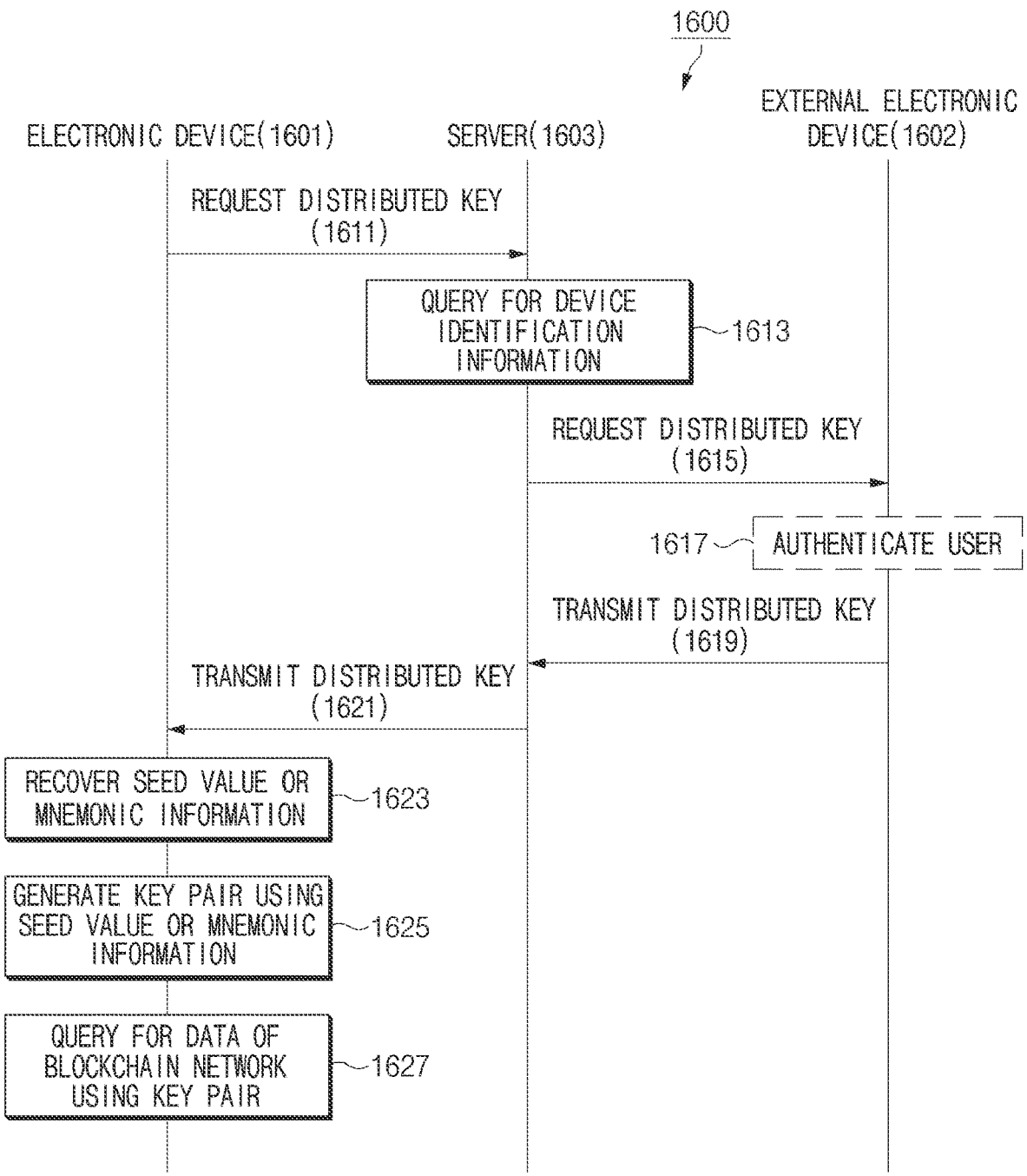
FIG. 16 is a signal sequence diagram illustrating a process of obtaining a distributed key through a server and recovering a key value, according to an embodiment of the disclosure.

FIG. 16 is a signal sequence diagram illustrating a process of obtaining a distributed key through a server (e.g., a server of FIG. 1 or a server of FIG. 2) and recovering a key value, according to an embodiment of the disclosure.

Referring to FIG. 16 depicting a process 1600, in operation 1611, an electronic device 1601 (e.g., an electronic device 101 of FIG. 1 or an electronic device 210 of FIG. 2) may request a distributed key from the server 1603. According to an embodiment, operation 1611 may be performed, when an event required to recover a seed value or mnemonic information which is a key value occurs.

In response to the distributed key request, in operation 1613, the server 1603 may query for device identification information stored in the server 1603 or a database connected with the server 1603. According to an embodiment, the server 1603 may query for device identification information based on a user account which is logged in to the server 1603 by means of the electronic device 1601. In other words, the server 1603 may query for the device identification information stored in conjunction with the user account.

In operation 1615, the server 1603 may select at least one distributed storage device based on the found device identification information and may request a distributed key from at least one external electronic device 1602 (e.g., an external electronic device 240 of FIG. 2) corresponding to the at least one selected distributed storage device.

According to an embodiment, when user authentication is required for the distributed key stored in the external electronic device 1602, in operation 1617, the external electronic device 1602 may perform an operation of authenticating a user. For example, the external electronic device 1602 may display a screen for receiving user authentication information on a display of the external electronic device 1602 and may receive the user authentication information using the displayed screen. For another example, the external electronic device 1602 may request information for authenticating the user from the electronic device 1601 or may request the result of authenticating the user from the electronic device 1601. The external electronic device 1602 according to an embodiment may perform operation 1419, only when the user is authenticated as a legitimate user in operation 1617 (e.g., when the received user authentication information and set user authentication information are matched with each other). However, in some cases (e.g., specifications of the external electronic device 1602 are unable to perform user authentication), operation 1617 may be omitted.

In operation 1619, the at least one external electronic device 1602 may transmit the at least one distributed key to the server 1603. Alternatively, the at least one external electronic device 1602 may transmit the at least one distributed key to the electronic device 1601. According to an embodiment, the distributed key may be encrypted and distributed to strengthen security. At this time, the external electronic device, the server, and the electronic device may share a key for encryption/decryption, depending on a previously shared encryption algorithm According to an embodiment, encryption/decryption may not perform separately, and it may be protected and delivered by means of encryption based on packet encryption for data security on a communication protocol.

In operation 1621, the server 1603 may transmit the at least one received distributed key to the electronic device 1601. In operation 1621, when information (e.g., an encryption code) for decrypting the at least one distributed key is stored in the server 1603 or a database connected with the server 1603, the server 1603 may further transmit the information for decrypting the distributed key to the electronic device 1601.

In operation 1623, the electronic device 1601 may recover a seed value or mnemonic information which is a key value which is distributed and stored based on the at least one distributed key. When the seed value or the mnemonic information is recovered, in operation 1625, the electronic device 1601 may generate a key pair using the seed value or the mnemonic information. In operation 1627, the electronic device 1601 may query a blockchain network (e.g., a blockchain network 220 of FIG. 2) using the generated key pair. When the seed value or the mnemonic information is normally recovered, the electronic device 1601 may normally obtain transaction data stored in the blockchain network.

According to an embodiment, the electronic device may combine and use a process 1400 shown in FIG. 14 and a process 1600 shown in FIG. 16. For example, the electronic device may obtain a portion of the distributed key through the process 1400 shown in FIG. 14 from an external electronic device (e.g., a wearable device connected through short range wireless communication) directly connected with the electronic device and may obtain the rest of the distributed key through the process 1600 shown in FIG. 16 from an external electronic device (e.g., an IoT device) connected through the server.

Figure 17:
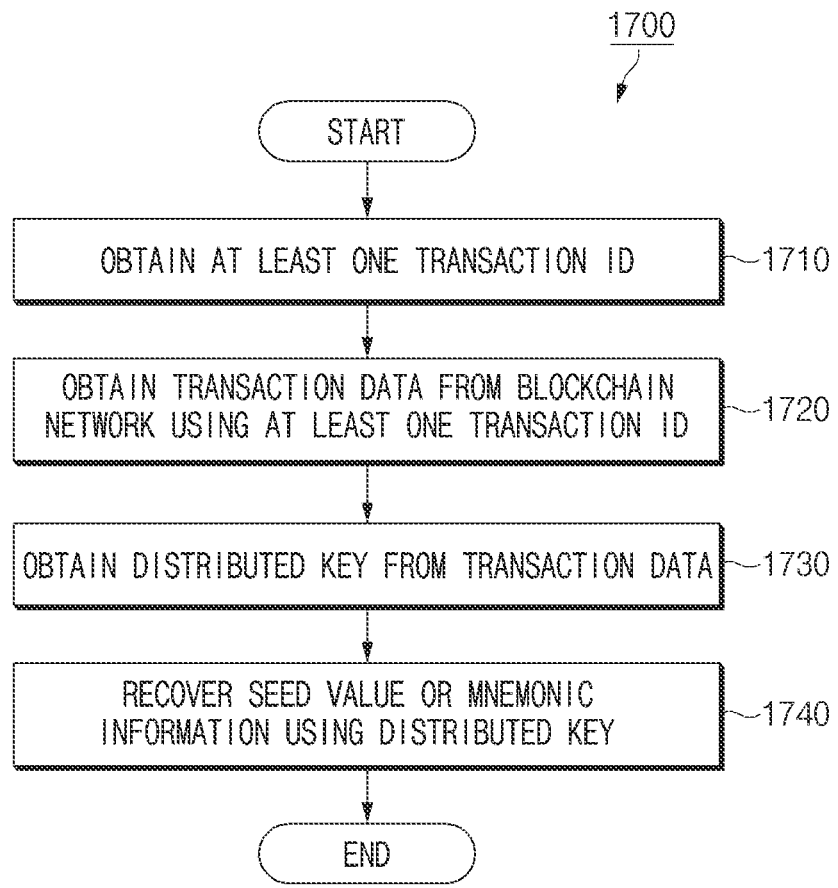
FIG. 17 is a flowchart illustrating a process of recovering a key value using a distributed key stored in a blockchain network, according to an embodiment of the disclosure.

FIG. 17 is a flowchart illustrating a process of recovering a key value using a distributed key stored in a blockchain network, according to an embodiment of the disclosure.

Referring to FIG. 17 depicting a process 1700, when an event required to recover a seed value or mnemonic information which is a key value occurs, in operation 1710, an electronic device (e.g., an electronic device 101 of FIG. 1 or an electronic device 210 of FIG. 2) may obtain at least one transaction ID. For example, similar to operation 1411 of FIG. 14, in response to a device identification information request transmitted to a server (e.g., a server 108 of FIG. 1 or a server 230 of FIG. 2), the electronic device may receive at least one transaction ID from the server. Alternatively, the transaction ID may be one stored in the electronic device.

The transaction ID may be information for identifying transaction data which includes a distributed key and is stored in a blockchain network (e.g., a blockchain network 1002 of FIG. 10). A device which accesses the blockchain network may identify transaction data recorded in a node included in the blockchain network based on the transaction ID. Thus, in operation 1720, the electronic device (e.g., a processor 213) may obtain transaction data from the blockchain network using the transaction ID. In operation 1730, the electronic device (e.g., the processor 213) may obtain a distributed key included in the transaction data. Obtaining the distributed key, in operation 1740, the electronic device (e.g., the processor 213) may recover a seed value or mnemonic in which is a key value.

Figure 18:
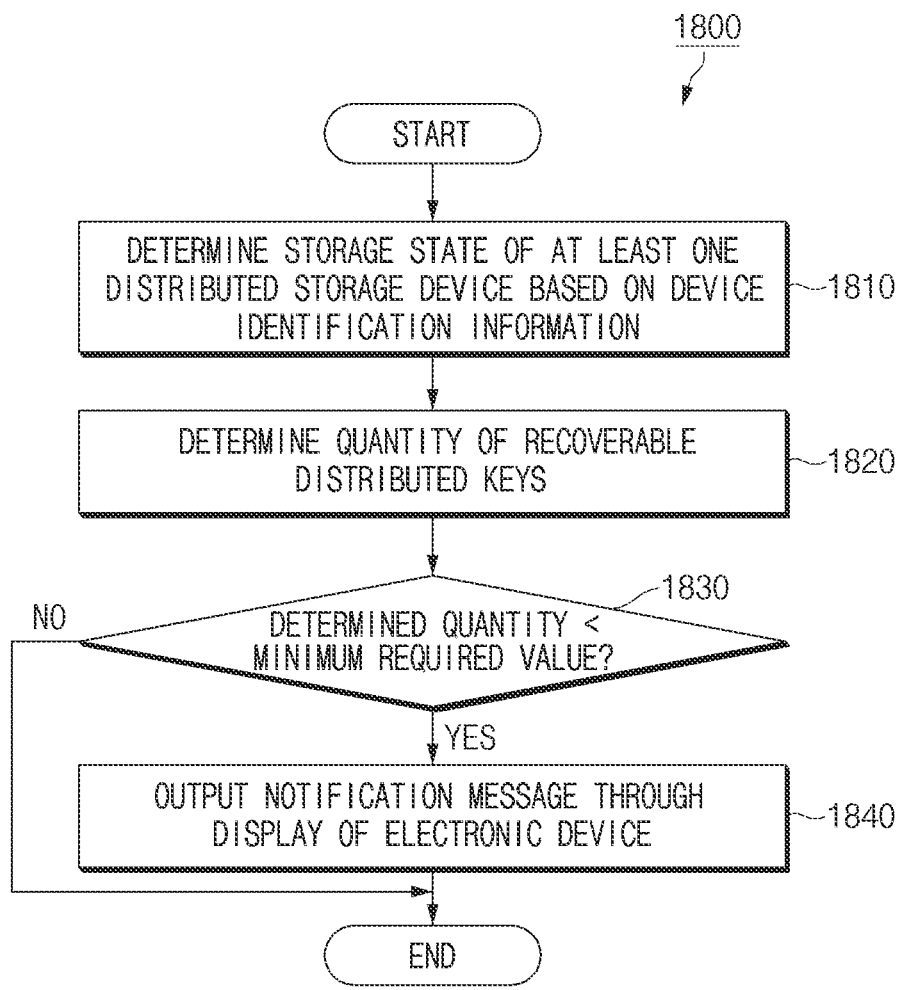
FIG. 18 is a flowchart illustrating a process where an electronic device or a server monitors a storage state of the stored distributed key, according to an embodiment of the disclosure.

FIG. 18 is a flowchart illustrating a process where an electronic device (e.g., an electronic device of FIG. 1 or an electronic device of FIG. 2) or a server (e.g., a server of FIG. 1 or a server of FIG. 2) monitors a storage state of the stored distributed key, according to an embodiment of the disclosure.

Referring to FIG. 18 depicting a process 1800, in operation 1810, the electronic device or the server may determine a storage state of at least one distributed storage device (e.g., an external electronic device 240 of FIG. 2) based on device identification information. The storage state may refer to a state about whether it is able to obtain a distributed key stored in each distributed storage device from the distributed storage device. For example, the electronic device or the server may transmit a message requesting a reply from a distributed storage device corresponding to the device identification information. The electronic device or the server may determine a storage state based on whether a response message is received from at least one distributed storage device.

According to an embodiment, the electronic device may output information about the determined storage state. According to another embodiment, the server may transmit information about the storage state to the electronic device, and the electronic device may output the information about the storage state. For example, the electronic device may display a list of at least one distributed storage device, based on device identification information about the at least one distributed storage device. The electronic device may display the storage state on an item corresponding to the distributed storage device included in the list.

In operation 1820, the quantity of recoverable distributed keys may be identified based on the storage state of the at least one distributed storage device. For example, when storage states of a first distributed storage device which stores three distributed keys and a second distributed storage device which stores one distributed key are normal, the server or the electronic device may determine that the quantity of recoverable distributed keys is 4. For another example, it is assumed that the key value is divided and stored into distributed key A, distributed key B, distributed key C, and distributed key D. For example, when storage states of the first distributed storage device which stores distributed key A and distributed key B and the second distributed storage device which stores distributed key B and distributed key C are normal, the server or the electronic device may determine that the quantity of recoverable distributed keys is 3 except for the quantity of duplicated distributed keys.

In operation 1830, the server or the electronic device may determine whether the quantity of recoverable distributed keys is less than a minimum required value required to recover a key value. For example, when the value (the quantity of recoverable distributed keys) determined in operation 1820 is 3 and when the minimum required value is 4, the server or the electronic device may determine that the determined quantity of recoverable distributed keys is less than the minimum required value. The minimum required value may be a value determined when at least one distributed key is generated. For example, the minimum required value may be determined based on the total quantity of at least one distributed key divided from the key value.

According to an embodiment, when determining that the quantity of recoverable distributed keys is less than the minimum required value required to recover the key value in operation 1830, in operation 1840, the server may transmit a notification message to the electronic device. The electronic device may output the received notification message. The notification message may include a message guided to distribute and store the key value again. According to another embodiment, when determining that the quantity of recoverable distributed keys is less than the minimum required value required to recover the key value in operation 1830, the electronic device may display the notification message on a display (e.g., a display device 160 of FIG. 1 or a display 211 of FIG. 2) the electronic device.

According to another embodiment, when the quantity determined in operation 1830 is less than or equal to the minimum required value, the server or the electronic device may perform operation 1840.

Figure 19:
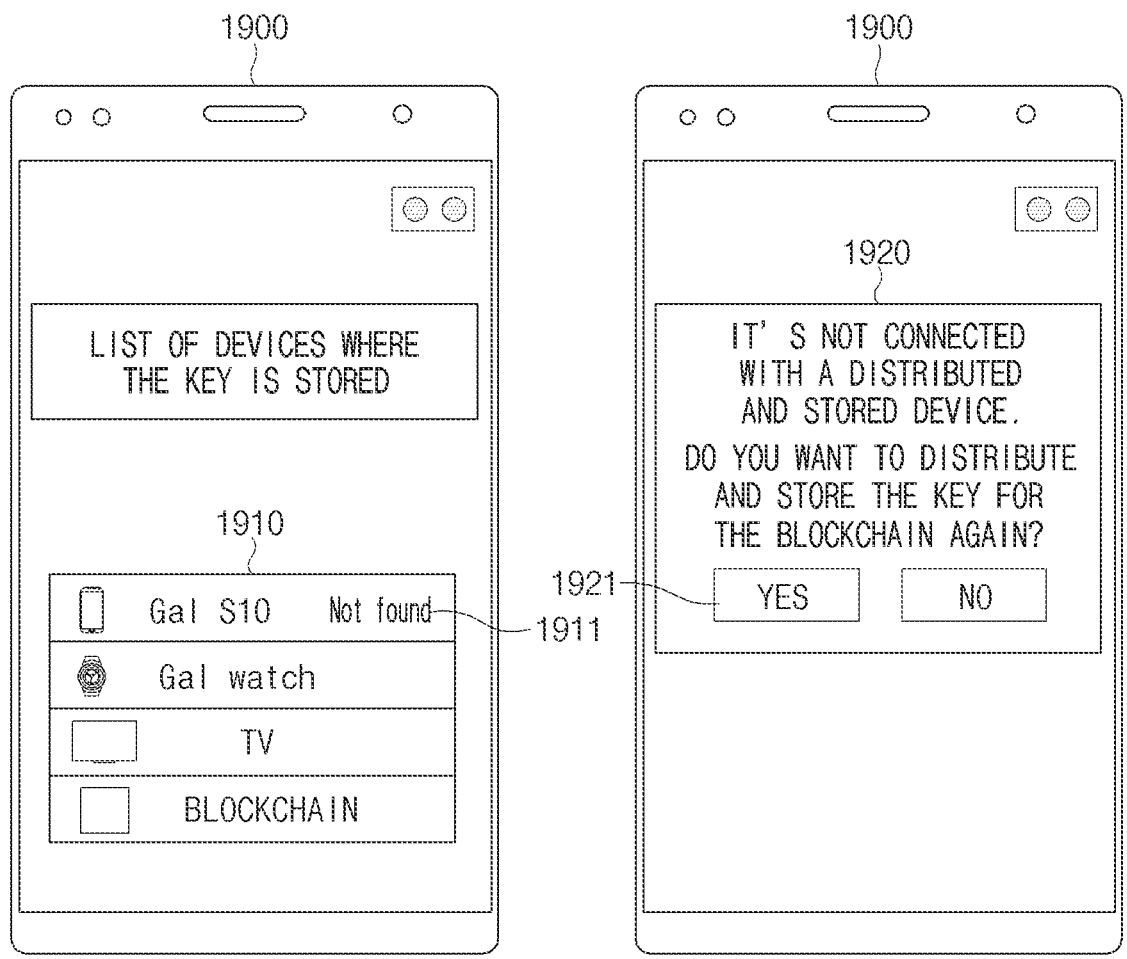
FIG. 19 illustrates an example of a screen displayed according to a storage state of a distributed key by an electronic device, according to an embodiment of the disclosure.

FIG. 19 illustrates an example of a screen displayed according to a storage state of a distributed key by an electronic device (e.g., an electronic device of FIG. 1 or an electronic device of FIG. 2), according to an embodiment of the disclosure.

Referring to FIG. 19, according to an embodiment, the electronic device 1900 may display a list 1910 of at least one distributed storage device, based on device identification information about the at least one distributed storage device which stores at least one distributed key. The device identification information may be stored in an electronic device 1900 or may be received from a server (e.g., a server 108 of FIG. 1 or a server 230 of FIG. 3).

The electronic device 1900 may display an indicator 1911 on an item corresponding to a distributed storage device which is determined that the storage state is not normal among the distributed storage devices included in the list 1910. The indicator 1911 may be a character or an image.

When the quantity of recoverable distributed keys is less than a minimum required value required to recover a key value, the electronic device 1900 may output a notification message 1920. When a user input selecting a confirm button 1921 included in the notification message is received, the electronic device 1900 may execute a process which distributes and stores the key value (e.g., a process 300 shown in FIG. 3, a process 500 shown in FIG. 5, a process 600 shown in FIG. 6, a process 700 shown in FIG. 7, a process 800 shown in FIG. 8, a process 900 shown in FIG. 9, or a process 1000 shown in FIG. 10).

However, FIG. 19 is only an example, and the method for displaying the storage state of the distributed storage device may be variously modified.

Figure 20:
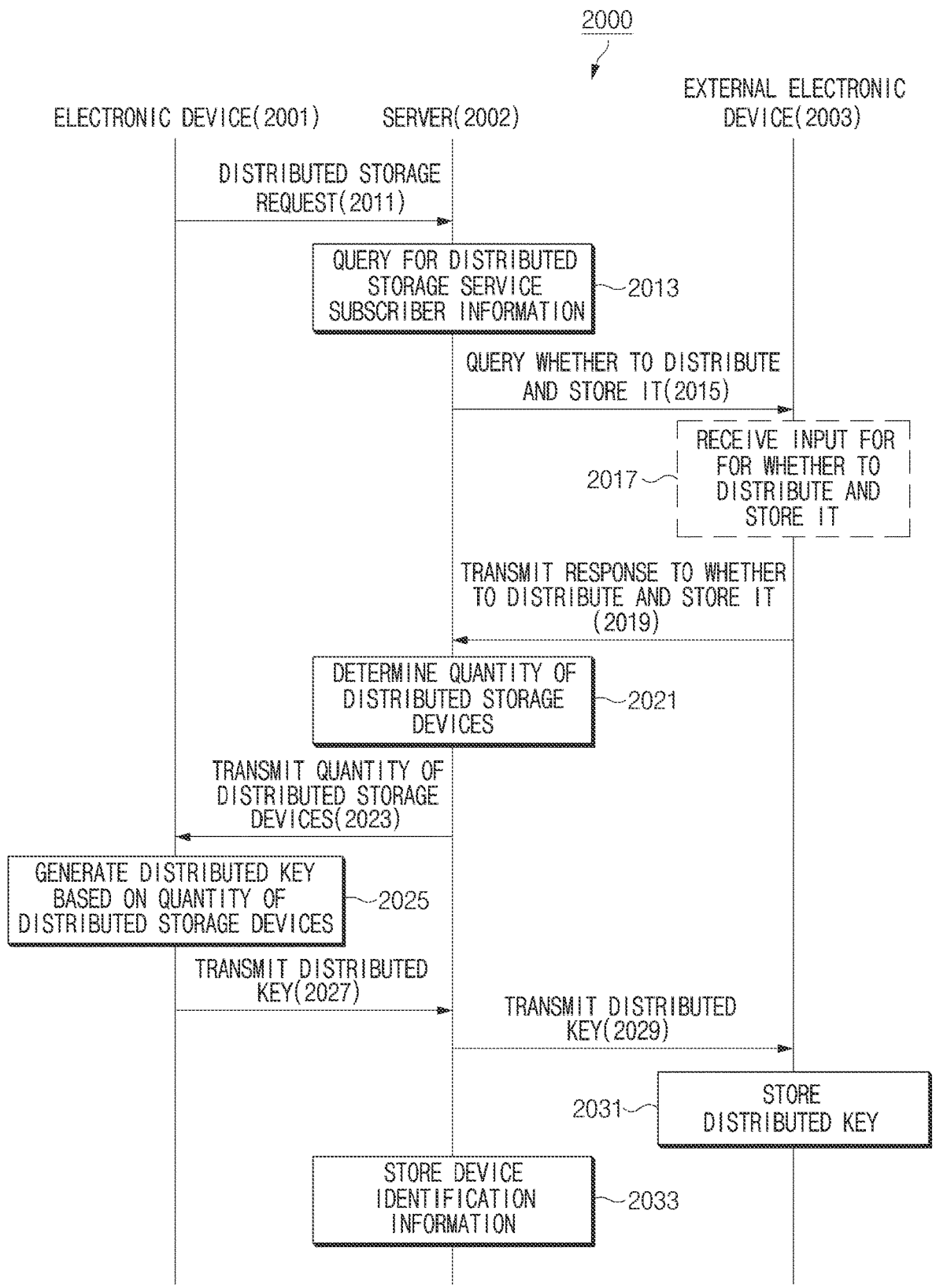
FIG. 20 is a signal sequence diagram illustrating a process of storing a distributed key using an external electronic device registered with a distributed storage service, according to an embodiment of the disclosure.

FIG. 20 is a signal sequence diagram illustrating a process of storing a distributed key using an external electronic device (e.g., an external electronic device of FIG. 2) registered with a distributed storage service, according to an embodiment of the disclosure.

Referring to FIG. 20 depicting a process 2000, in operation 2011, an electronic device 2001 (e.g., an electronic device 101 of FIG. 1 or an electronic device 210 of FIG. 2) may request a server 2002 (e.g., a server 108 of FIG. 1 or a server 230 of FIG. 2) to distribute and store a key value. Receiving the distributed storage request, in operation 2013 the server 2002 may query for distributed storage service subscriber information which is information about a user and/or a device which subscribes to a distributed storage service, which is stored in the server 2002 or a database connected with the server 2002. For example, the distributed storage service subscriber information may include a mobile phone number.

The server 2002 may select at least one external electronic device 2003 based on the found distributed storage service subscriber information. According to an embodiment, in operation 2015, the server 2002 may query whether to store a distributed key of the electronic device 2001 in the at least one selected external electronic device 2003. Receiving the query, the at least one external electronic device 2003 may output a user interface for selecting whether to approve to store the distributed key. When the user input for whether to approve to store the distributed key is received in operation 2017, in operation 2019, the external electronic device 2003 may transmit a response to whether to distribute and store it to the server 2002. According to another embodiment, operations 2115, 2117, and 2119 may be omitted.

In operation 2021, the server 2002 may determine the quantity of distributed storage devices. According to an embodiment, the server 2002 may determine the quantity of distributed storage devices based on the quantity of the at least one external electronic device 2003 which transmit a response approving to store the distributed key. According to another embodiment, the server 2002, in operation 2021, may determine the quantity of the at least one distributed storage device selected by the server 2002 as the quantity of distributed storage devices. In operation 2023, the server 2002 may transmit the determined quantity of the distributed storage devices to the electronic device 2001.

In operation 2025, the electronic device 2001 may generate a distributed key based on the quantity of the distributed storage devices. For example, when the quantity of the distributed storage devices is 100, the electronic device may divide the key value into 100 to generate 100 distributed keys. For another example, when the quantity of the distributed storage devices is 100, the electronic device may store 50 distributed keys in preparation for loss of the distributed keys, such that one distributed key is stored in a plurality of distributed storage devices.

When the electronic device 2001 transmits at least one distributed key to the server 2022 in operation 2027, in operation 2029, the server 2002 may distribute and store the at least one distributed key to the at least one external electronic device 2003. In operation 2031, each external electronic device 2003 may store the transmitted distributed key.

According to an embodiment, in operation 2027, the second electronic device (e.g., electronic device 2001) may encrypt and transmit the distributed key to the server 2002. When encrypting the distributed key, the electronic device 2001 may transmit information for decrypting the distributed key to the server 2002. Receiving the information for decrypting the distributed key, the server 2002 may store the information for decrypting the distributed key.

When it is verified whether the distributed key is normally stored in the external electronic device 2003, in operation 2033, the server 2002 may associate and store device identification information about the external electronic device 2003 with a user account in the server 2002 or a database connected with the server 2002. Furthermore, according to an embodiment, when it is verified that the distributed key is normally stored in the external electronic device 2003, the server 2002 may allocate a reward to a user of the external electronic device 2003. For example, the server 2002 may provide the user of the external electronic device 2003 with a token used as a target of a transaction in a blockchain network (e.g., a blockchain network 220 of FIG. 2).

Figure 21:
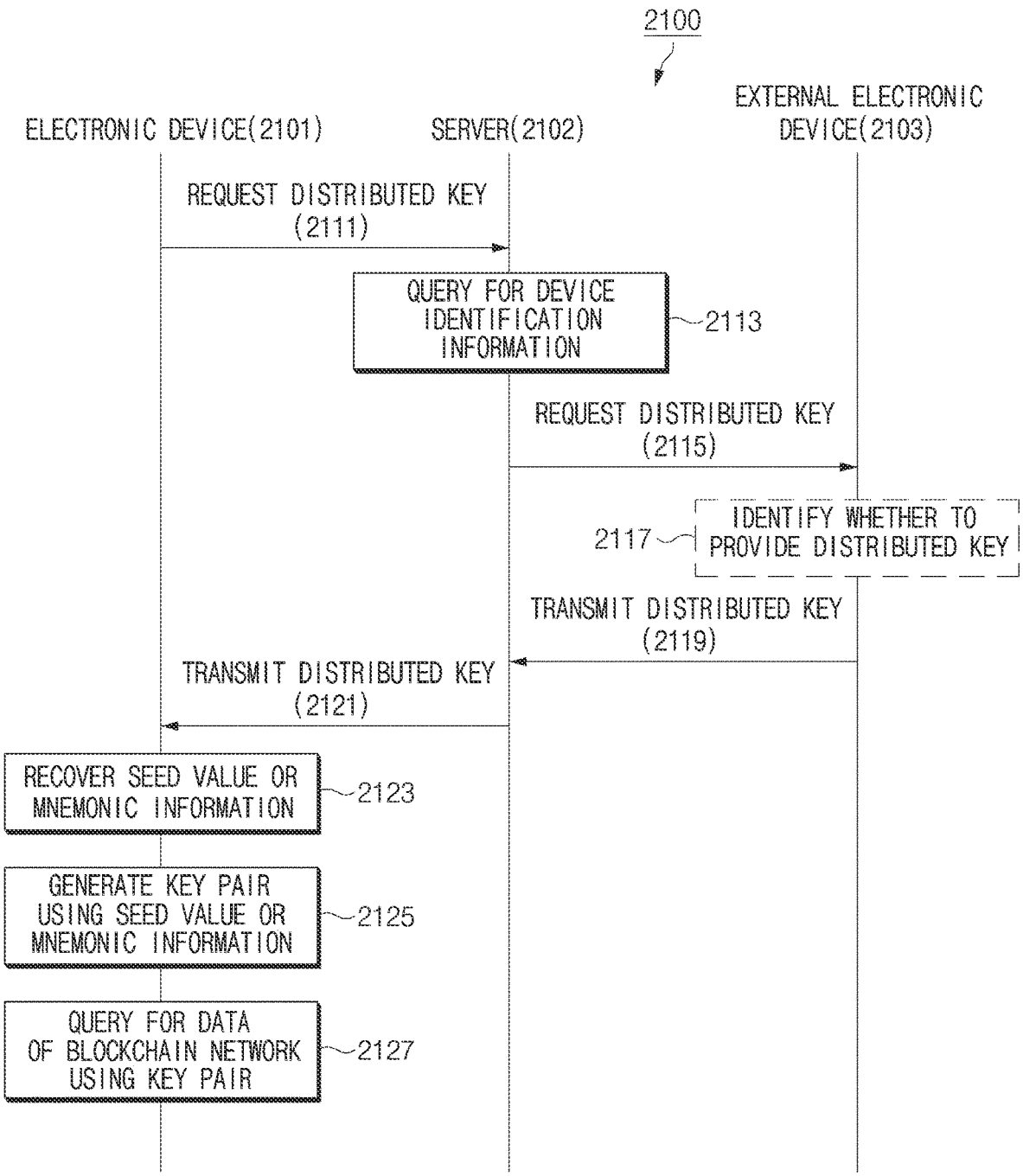
FIG. 21 is a signal sequence diagram illustrating a process of recovering a distributed key using an external electronic device registered with a distributed storage service of a server, according to an embodiment of the disclosure.

FIG. 21 is a signal sequence diagram illustrating a process of recovering a distributed key using an external electronic device (e.g., an external electronic device of FIG. 2) registered with a distributed storage service of a server, according to an embodiment of the disclosure.

Referring to FIG. 21 depicting a process 2100, when an event required to recover a seed value or mnemonic information which is a key value occurs in an electronic device 2101 (e.g., an electronic device 101 of FIG. 1 or an electronic device 210 of FIG. 2), in operation 2111, the electronic device 2101 may request a distributed key from a server 2102.

Receiving the distributed key request, in operation 2113, the server 2102 may query the server 2102 or a database connected with the server 2102 for device identification information of at least one external electronic device 2103 which is a distributed storage device which stores a distributed key based on a user account of the electronic device 2101.

In operation 2115, the server 2102 may request a distributed key from the external electronic device 2103 based on the found device identification information. According to an embodiment, in operation 2117, the external electronic device 2103 may output a user interface for receiving identification of whether to provide the distributed key. When a user input approving to provide the distributed key is received through the user interface, in operation 2119, the external electronic device 2103 may transmit the distributed key stored in the external electronic device 2103 to the server 2102. According to another embodiment, operation 2117 may be omitted.

Receiving the distributed key, in operation 2121, the server 2102 may transmit the received distributed key to the electronic device 2101. In operation 2121, when information (e.g., an encryption code) for decrypting at least one distributed key is stored in the server 2102 or the database connected with the server 2102, the server 2102 may further transmit the information for decrypting the distributed key to the electronic device 2101.

In operation 2123, the electronic device 2101 may recover a seed value or mnemonic information which is a key value which is distributed and stored based on the at least one distributed key. When the seed value or the mnemonic information is recovered, in operation 2125, the electronic device 2101 may generate a key pair using the seed value or the mnemonic information. In operation 2127, the electronic device 2101 may query a blockchain network (e.g., a blockchain network 220 of FIG. 2) using the generated key pair. When the seed value or the mnemonic information is normally recovered, the electronic device 2101 may normally obtain transaction data stored in the blockchain network.

Figure 22:
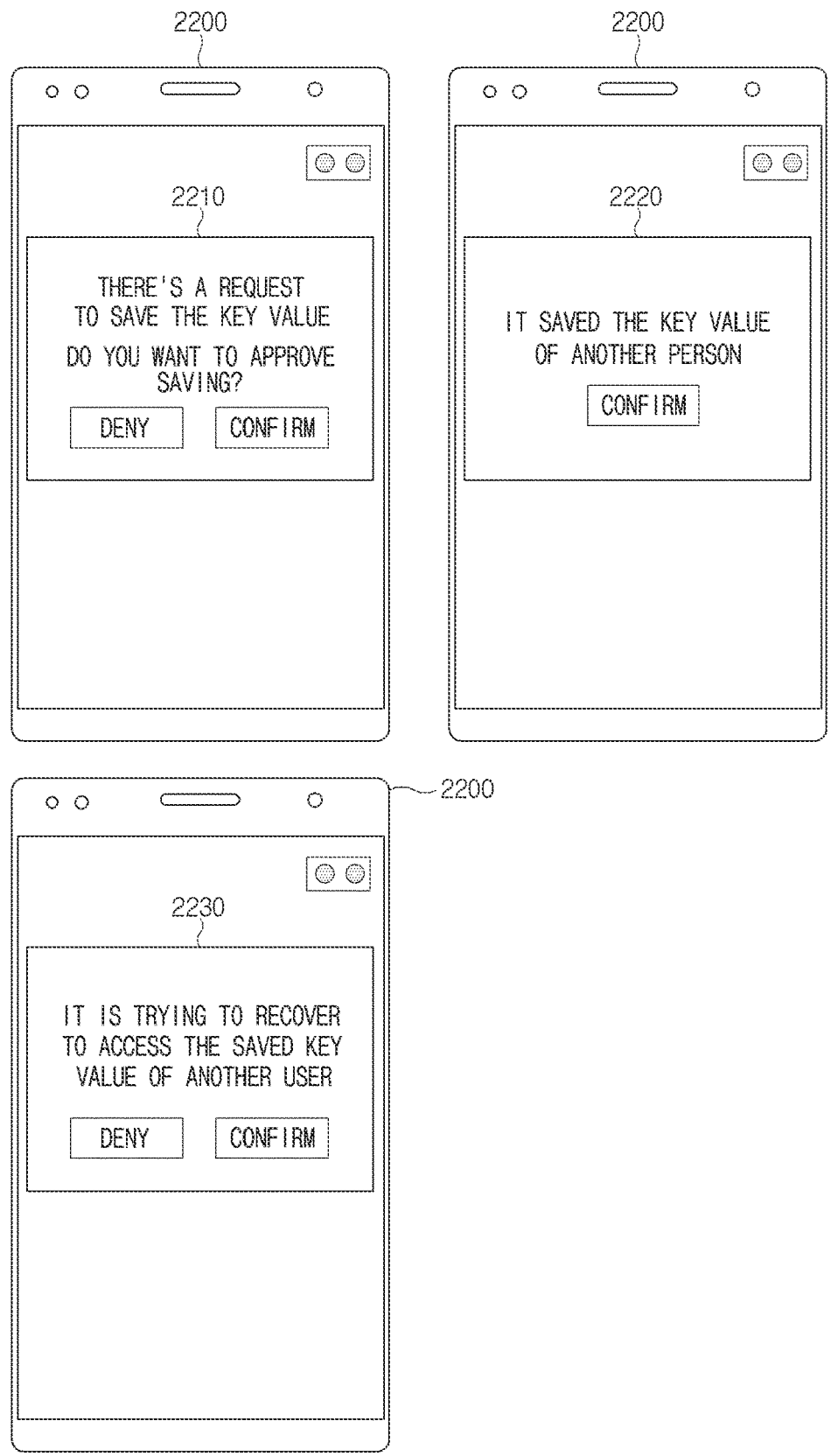
FIG. 22 illustrates an example of a screen displayed by an external electronic device registered with a distributed storage service of a server, according to an embodiment of the disclosure.

FIG. 22 illustrates an example of a screen displayed by an external electronic device (e.g., an external electronic device of FIG. 2) registered with a distributed storage service, according to an embodiment of the disclosure.

Referring to FIG. 22, according to an embodiment, when receiving a query about whether to store a distributed key (e.g., operation 2015 of FIG. 20), an external electronic device 2200 may display a message 2210 associated with whether to approve to store the distributed key. The external electronic device 2200 may determine whether to store the distributed key based on an input to the message 2210. According to an embodiment, when the distributed key is stored in the external electronic device 2200, the external electronic device 2200 may output a message 2220 indicating that the storage of the distributed key is completed.

According to an embodiment, when receiving a request to transmit the distributed key (e.g., operation 1210 of FIG. 12, operation 1415 of FIG. 14, operation 1615 of FIG. 16, or operation 2115 of FIG. 21), the external electronic device 2200 may output a message 2230 associated with whether to approve to transmit the distributed key. The external electronic device 2200 may transmit the distributed key stored in the external electronic device 2200 based on a user input to the message 2230.

Figure 23:
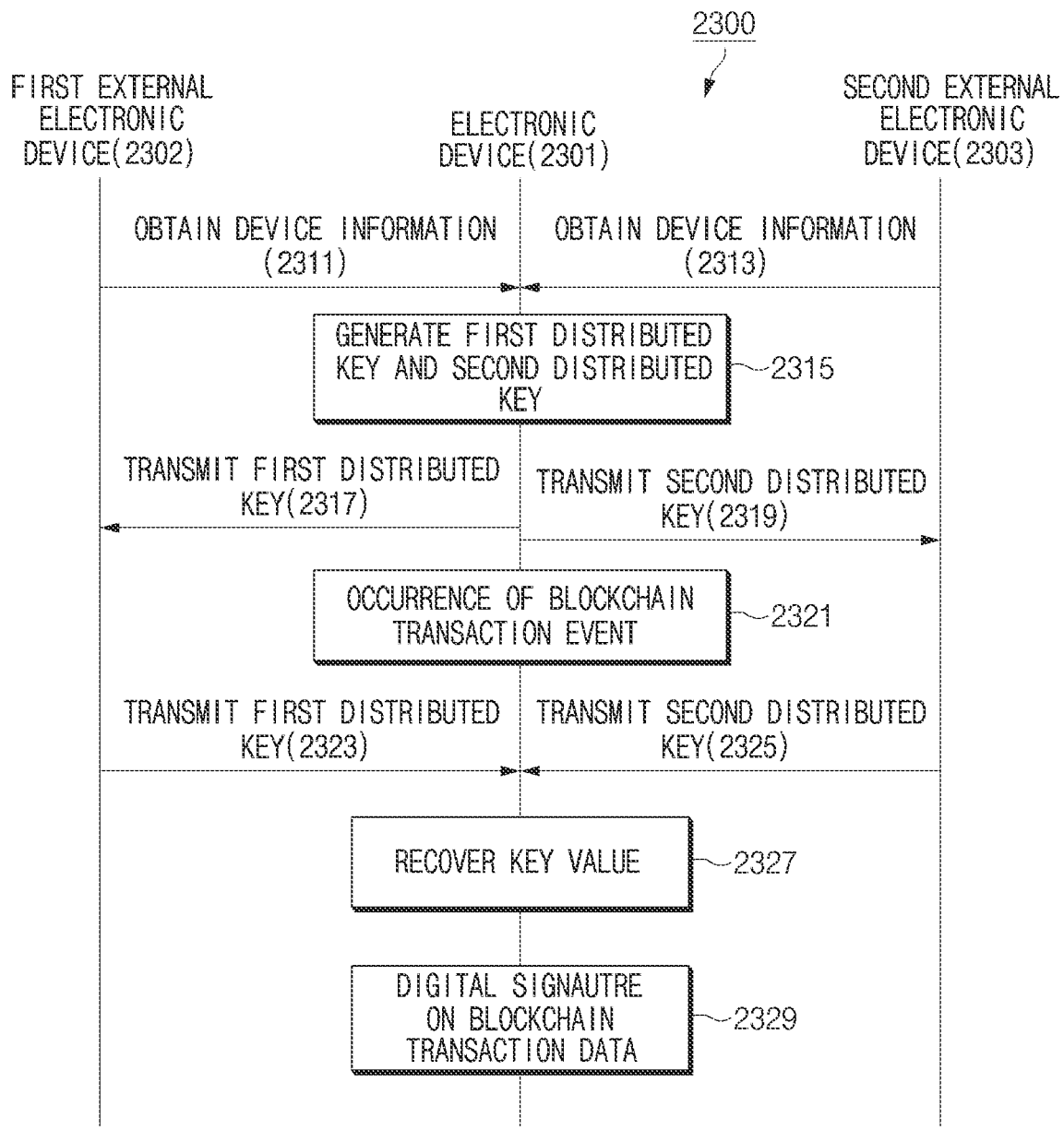
FIG. 23 is a signal sequence diagram illustrating a process performed for a blockchain transaction by an electronic device, according to an embodiment of the disclosure.

FIG. 23 is a signal sequence diagram illustrating a process performed for a blockchain transaction by an electronic device (e.g., an electronic device of FIG. 1 or an electronic device of FIG. 2), according to an embodiment of the disclosure.

Referring to FIG. 23 depicting a process 2300, according to an embodiment, in operation 2311 and operation 2313, an electronic device 2301 may obtain device information of a first external electronic device 2302 and device information of a second external electronic device 2303 associated with a user account of the electronic device 2301. Herein, the device associated with the user account may refer to a device logged in with the user account, a device connected with the device logged in with the user account, or a device registered with the user account. In operation 2311 and operation 2313, the electronic device 2301 may directly obtain the device information from the first external electronic device 2302 and the second external electronic device 2303 or may obtain the device information through a separate server (not shown) (e.g., a server 108 of FIG. 1 or a server 230 of FIG. 2).

The electronic device may select a distributed storage device to store a distributed key based on the device information. When selecting the first external electronic device 2302 and the second external electronic device 2303 as distributed storage devices, in operation 2315, the electronic device 2301 may generate a first distributed key and a second distributed key to divide a key value. In operation 2317, the electronic device 2301 may transmit the first distributed key to the first external electronic device 2302. In operation 2319, the electronic device 2301 may transmit the second distributed key to the second external electronic device 2303. According to an embodiment, when it is verified that the first distributed key and the second distributed key are normally stored, the key value may be deleted from the electronic device 2301.

When a blockchain transaction event occurs in operation 2321, the electronic device 2301 may request distributed keys from the first external electronic device 2302 and the second external electronic device 2303. In operation 2323 and operation 2325, the electronic device 2301 may receive the first distributed key and the second distributed key from the first external electronic device 2302 and the second external electronic device 2303.

In operation 2327, the electronic device 2301 may recover the key value using the first distributed key and the second distributed key. In operation 2329, the electronic device 2301 may perform a digital signature on blockchain transaction data using the recovered key value.

However, FIG. 23 illustrates that the distributed storage devices are the first external electronic device 2302 and the second external electronic device 2303 and the key value is divided into the two distributed keys. However, the quantity of distributed storage devices and the quantity of distributed keys may be changed according to an embodiment.

Embodiments disclosed in the disclosure may be configured by being combined with each other. For example, a plurality of distributed keys may be stored in two or more of at least one blockchain network, an external electronic device directly connected with the electronic device, and an external electronic device connected through a server and may be used to recover a key value.

Figure 24:
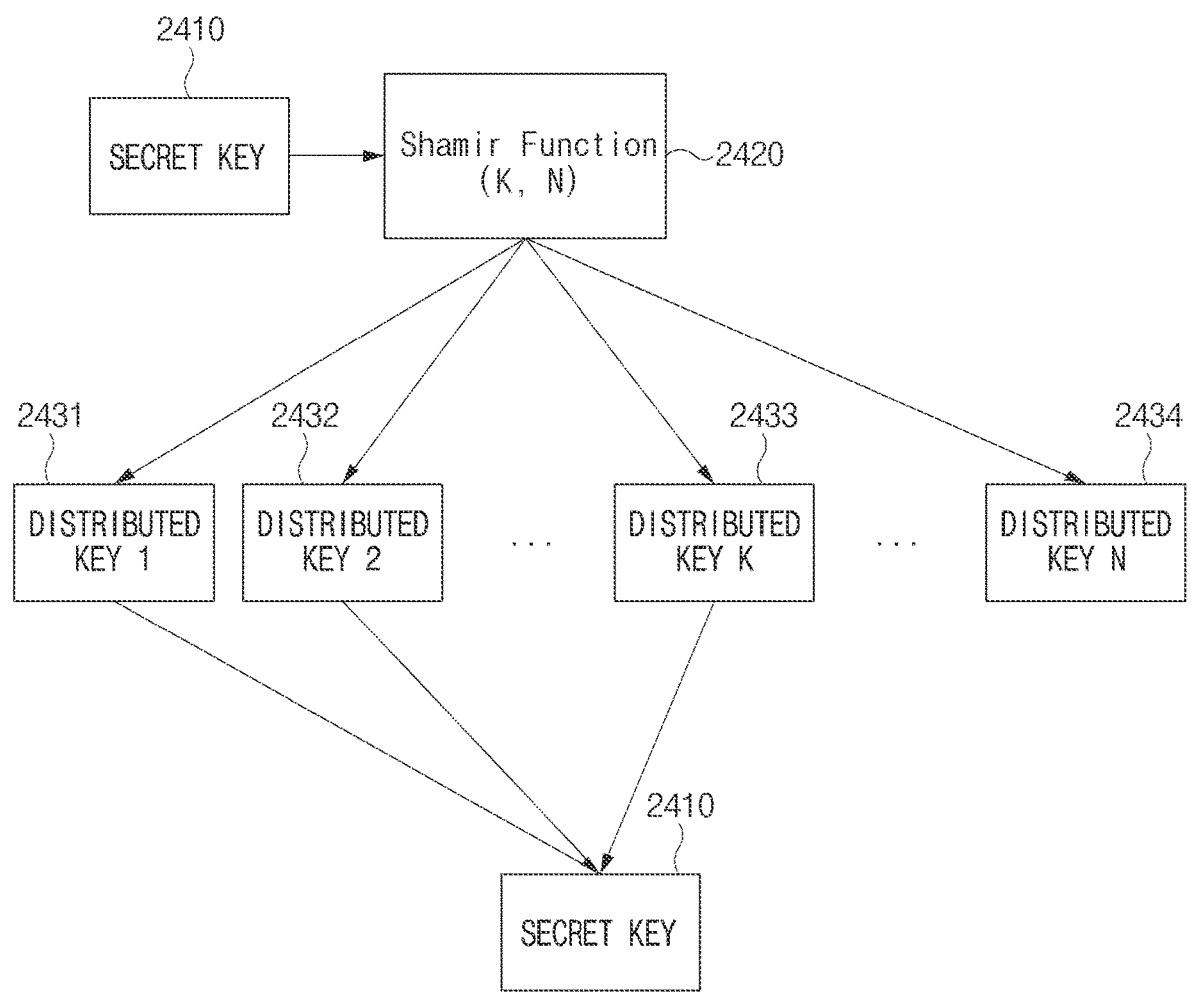
FIG. 24 illustrates the concept of an algorithm for generating and recovering a distributed key according to an embodiment of the disclosure.

FIG. 24 illustrates the concept of an algorithm for generating and recovering a distributed key according to an embodiment of the disclosure.

Referring to FIG. 24, according to an embodiment, an electronic device may divide a secret key (a key value) 2410 into distributed keys using the Shamir's sharing secret scheme (SSSS) algorithm. The SSSS algorithm may be an algorithm capable of distributing data into several pieces and recovering original data when pieces of distributed data of a certain number or more are collected.

The electronic device may input the secret key 2410 to a distribution function 2420 of the SSSS algorithm to divide the secret key 2410 into a plurality (e.g., n) of pieces 2431, 2432, 2433, and 2434. The plurality (e.g., n) of pieces may be configured to be restored to original secret information using k pieces 2431, 2432, and 2433 which are less than or equal to the plurality (e.g., n) of pieces. k for recovery may be selectively determined. The more k is the same as n, the more the security may increase. According to an embodiment, the electronic device may determine an input value (e.g., an n value) of a distributed number of the SSSS algorithm, which should be distributed according to a distributed storage device selected by information of the device. A parameter of the distribution function 2420 may include N which is the number of pieces of information distributed through the SSSS algorithm and K which is the number of pieces required for recovery. According to an embodiment, the electronic device may determine an N value and a K value depending on a policy. For example, when security is important, the N value may more increase and the secret key 2410 may be distributed and stored in more storage devices. According to an embodiment, the higher the K value which is the quantity of data necessary upon recovery, the more the distributed storage devices are required. According to an embodiment, the electronic device may determine the K value based on convenience according to recovery. For example, although a distributed storage value is not obtained from some of the distributed storage devices, the electronic device may set the K value to be less than the N value to be recovered. According to an embodiment, the electronic device may variably determine the N value and the K value. For example, when the size of the blockchain asset is large, to enhance security, the N value may be set to be high and the K value may be set to be high. In this case, more distributed storage devices for distributing and storing the secret key 2410 are required. The K value may be determined to be recovered only when all of distributed key values are obtained. For example, when the size of the blockchain asset is small or according to selection of a user, the N value and the K value may be set to be low. In this case, although the amount of distributed storage devices required for distributed storage is reduced and the electronic device does not obtain distributed data from all distributed storage devices, the electronic device may assist the user to recover distributed and stored data.

FIG. 25 illustrates an example of a distributed key generated in a determined condition, according to an embodiment of the disclosure.

FIG. 25 illustrates a condition 2510 where the key value is "This is the Samsung SECRET that will be separated", where the total quantity of distributed keys is 6, and where the minimum required value of distributed keys necessary to recover a key value is 3 according to an embodiment of the disclosure. However, "This is the Samsung SECRET that will be separated" is only an example used for convenience of description. An actual key value may include, for example, a mnemonic word (e.g., army van defense carry jealous true garbage claim echo media make crunch) or a rood seed (e.g., 5b56c417303faa3fcba7e57400e12 0a0ca83ec5a4fc9ffba757fbe63fbd77a89a1a3be4c67196f5 7c39a88b76373733891bfaba16ed27a813ceed4 98804c0570).

The electronic device according to an embodiment may set a value of parameter N of the SSSS algorithm to 6 and may set a value of parameter K to 3 to generate six distributed keys 2520.

FIG. 26 illustrates an example of recovering a key value using some of distributed keys which are generated in FIG. 25 and are distributed and stored, according an embodiment of the disclosure.

When first, second, and third distributed keys 2530 are obtained from a distributed storage device which stores six distributed keys, because a minimum required value set when distributed keys are generated is 3, the electronic device according to an embodiment may recover an original key value 2535.

When distributed keys are generated and recovered based on the SSSS algorithm, the key value may be recovered when the quantity of obtained distributed keys meets the minimum required value irrespective of an order of the obtained distributed keys. Referring to FIG. 26, when first, third, and sixth distributed keys 2540 are obtained, the electronic device according to an embodiment may recover a key value 2545.

FIG. 27 illustrates an example of recovering a key value using some of distributed keys which are generated in FIG. 25 and are distributed and stored, according an embodiment of the disclosure.

According to an embodiment, although distributed keys of a quantity greater than a minimum required value are obtained, an electronic device may recover a key value. Referring to FIG. 27, when third, fourth, fifth, and sixth distributed keys 2550 are be obtained, the electronic device according to an embodiment may recover a key value 2555.

When the quantity of the obtained distributed keys is less than the minimum required value, the electronic device may fail to recover the key value. Referring to FIG. 27, when it is possible to obtain only first and second distributed keys 2560, the electronic device according to an embodiment may fail (2565) to recover a distributed key.

The higher the minimum required value of distributed keys required to recover the key value, the more the security may be improved. However, because it is unable to recover the key value, the electronic device may suitably adjust the minimum required value depending on a security level required for the key value.

As described above, an electronic device (e.g., electronic device 210 of FIG. 2) according to an embodiment may include a memory (e.g., memory 214 of FIG. 2), a communication circuit (e.g., communication circuit 212 of FIG. 2), a display (e.g., display 211 of FIG. 2), and a processor (e.g., processor 213 of FIG. 2) connected with the memory, the communication circuit, and the display. The memory may store instructions, when executed, causing the processor to obtain device information about at least one external electronic device (e.g., external electronic device 240 of FIG. 2), select at least one distributed storage device for storing a distributed key from the at least one external electronic device, based on the device information, generate at least one distributed key to divide a seed value or mnemonic information for generating a key for performing a digital signature on data to be transmitted to a blockchain network, and control the communication circuit such that the at least one distributed key is distributed and transmitted to the at least one distributed storage device.

According to an embodiment, the instructions may include instructions causing the processor to encrypt the at least one distributed key value and control the communication circuit to transmit at least one encrypted distributed key value to the at least one distributed storage device.

According to an embodiment, the instructions may include instructions causing the processor to obtain user authentication information and encrypt the at least one distributed key value using the user authentication information.

According to an embodiment, the user authentication information may include biometric information obtained by a plurality of biometric information inputs. The instructions may include instructions causing the processor to extract key information included in common in each of the plurality of biometric information inputs from the biometric information and encrypt the at least one distributed key value using the key information.

According to an embodiment, the instructions may include instructions causing the processor to determine a total quantity of the at least one distributed key, based on the device information, and generate the at least one distributed key based on the determined total quantity.

According to an embodiment, the device information includes at least one of device type information, a device identifier, a user account, device specification information, device position information, and a device name for each of the at least one external electronic device.

According to an embodiment, the instructions may include instructions causing the processor to determine a priority for the at least one external electronic device based on the device information and display a device list of the at least one external electronic device on the display, based on the priority.

According to an embodiment, the instructions may include instructions causing the processor to determine the priority based on at least one of device type information and device specification information included in the device information.

According to an embodiment, the instructions may include instructions causing the processor to transmit a distributed key transmission request to at least some of the at least one distributed storage device, using the communication circuit, receive at least some of the at least one distributed key through the communication circuit, and recover the seed value or the mnemonic information based on the at least some of the at least one distributed key.

According to an embodiment, the instructions may include instructions causing the processor to transmit device identification information about the at least one distributed storage device to an external server, request the device identification information from the external server, when an event required to recover the seed value or the mnemonic information occurs, receive the device identification information from the external server, and transmit the distributed key transmission request using the device identification information.

According to an embodiment, the instructions may include instructions causing the processor to determine a storage quantity of distributed keys to be stored in each of the at least one distributed storage device based on the device information and distribute and store the at least one distributed key in the at least one distributed storage device, based on the storage quantity.

According to an embodiment, the instructions may include instructions causing the processor to determine storage state information indicating whether it is able to obtain the at least one distributed key value from the at least one distributed storage device, determine whether it is possible to recover the seed value or the mnemonic information based on the storage state information, and output a message associated with distributing and storing the seed value or the mnemonic information through the display, when it is impossible to recover the seed value or the mnemonic information.

Furthermore, as described above, an electronic device (e.g., electronic device 210 of FIG. 2) according to an embodiment may include a memory (e.g., memory 214 of FIG. 2), a communication circuit (e.g., communication circuit 212 of FIG. 2), and a processor (e.g., processor 213 of FIG. 2) connected with the memory and the communication circuit. The memory may store instructions, when executed, causing the processor to obtain device information including information about a first external electronic device or a second external electronic device, generate a first distributed key and a second distributed key for recovering a key value, based on the device information, transmit the first distributed key to the first external electronic device through the communication circuit, transmit the second distributed key to the second external electronic device, obtain the first distributed key and the second distributed key from the first external electronic device and the second external electronic device, when an event for generating blockchain transaction data to be transmitted to a blockchain network occurs, and perform a digital signature on the blockchain transaction data, based on a key value recovered using the first distributed key and the second distributed key.

According to an embodiment, the key value may include a seed value or mnemonic information for generating a private key for performing the digital signature. The instructions may include instructions causing the processor to divide the seed value or the mnemonic information to generate the first distributed key and the second distributed key.

According to an embodiment, the instructions may include instructions causing the processor to generate the seed value or the mnemonic information using the first distributed key and the second distributed key, generate a private key using the seed value or the mnemonic information, and perform the digital signature using the private key.

Furthermore, as described above, a server (e.g., server 230 of FIG. 2) according to an embodiment may include a memory (e.g., memory 130 of FIG. 1), a communication circuit (e.g., at least a part of communication module 190 of FIG. 1), and a processor (e.g., processor 120 of FIG. 1) connected with the memory and the communication circuit. The memory may store instructions, when executed, causing the processor to obtain device information about at least one external electronic device associated with a user account, receive a distributed key storage request requesting to store at least one distributed key to divide a seed value or mnemonic information for generating a key for performing a digital signature on data to be transmitted to a blockchain network by an electronic device logged in to the server with the user account from the electronic device, select at least one distributed storage device based on the device information, in response to the distributed key storage request, distribute and transmit the at least one distributed key to the at least one distributed storage device, through the communication circuit, and associate and store identification information of the at least one distributed storage device with the user account in the memory.

According to an embodiment, the instructions may cause the processor to receive a distributed key recovery request from the electronic device logged in to the server with the user account, search for the identification information based on the user account, in response to the distributed key recovery request, and transmit the identification information to the electronic device.

According to an embodiment, the instructions may cause the processor to receive a distributed key recovery request from the electronic device logged in to the server with the user account, search for the identification information based on the user account, in response to the distributed key recovery request, obtain the at least one distributed key from the at least one distributed storage device based on the identification information, and transmit the at least one distributed key to the electronic device.

Furthermore, as described above, an electronic device (e.g., electronic device 210 of FIG. 2) according to an embodiment may include a memory (e.g., memory 214 of FIG. 2), a communication circuit (e.g., communication circuit 212 of FIG. 2), a display (e.g., display 211 of FIG. 2), and a processor (e.g., processor 213 of FIG. 2) connected with the memory, the communication circuit, and the display. The memory may store instructions, when executed, causing the processor to receive a storage request for at least one distributed key to divide a seed value or mnemonic information for generating a key for performing a digital signature on data to be transmitted to a blockchain network from an external server, store the at least one distributed key in the memory in response to the storage request, receive an access request for the at least one distributed key from the external server through the communication circuit, and output a notification message through the display, in response to the access request.

Furthermore, as described above, a method for recovering a key value in an electronic device (e.g., electronic device 210 of FIG. 2) according to an embodiment may include obtaining device information about at least one external electronic device, selecting at least one distributed storage device for storing a distributed key from the at least one external electronic device, based on the device information, generating at least one distributed key to divide a seed value or mnemonic information for generating a key for performing a digital signature on data to be transmitted to a blockchain network, and distributing and transmitting the at least one distributed key to the at least one distributed storage device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a memory;
    a communication circuit;
    a display; and
    a processor connected with the memory, the communication circuit, and the display,
    wherein the memory stores instructions, when executed, causing the processor to:
        obtain device information about a plurality of external electronic devices,
        select a plurality of distributed storage devices for storing a distributed key from the plurality of external electronic devices, based on the device information,
        generate a plurality of distributed keys to divide a seed value or mnemonic information for generating a key for performing a digital signature on data to be transmitted to a blockchain network, and
        control the communication circuit such that the plurality of distributed keys are distributed and transmitted to the plurality of distributed storage devices.

2. The electronic device of claim 1, wherein the instructions further cause the processor to:
    encrypt a plurality of distributed key values; and
    control the communication circuit to transmit the plurality of encrypted distributed key values to the plurality of distributed storage devices.

3. The electronic device of claim 2, wherein the instructions further cause the processor to:
    obtain user authentication information; and
    encrypt the plurality of distributed key values using the user authentication information.

4. The electronic device of claim 3,
    wherein the user authentication information includes biometric information obtained by a plurality of biometric information inputs, and
    wherein the instructions further cause the processor to:
        extract key information included in common in each of the plurality of biometric information inputs from the biometric information, and
        encrypt the plurality of distributed key values using the key information.

5. The electronic device of claim 1, wherein the instructions further cause the processor to:
    determine a total quantity of the plurality of distributed keys, based on the device information; and
    generate the plurality of distributed keys based on the determined total quantity.

6. The electronic device of claim 1, wherein the device information includes at least one of device type information, a device identifier, a user account, device specification information, device position information, and a device name for each of the plurality of external electronic devices.

7. The electronic device of claim 1, wherein the instructions further cause the processor to:
    determine priorities for the plurality of external electronic devices based on the device information; and
    display a device list of the plurality of external electronic devices on the display, based on the priorities.

8. The electronic device of claim 7, wherein the instructions further cause the processor to:
    determine the priorities based on at least one of device type information and device specification information included in the device information.

9. The electronic device of claim 1, wherein the instructions further cause the processor to:
    transmit a distributed key transmission request to at least some of the plurality of distributed storage devices, using the communication circuit;
    receive at least some of the plurality of distributed keys, through the communication circuit; and
    recover the seed value or the mnemonic information based on the at least some of the plurality of distributed keys.

10. The electronic device of claim 9, wherein the instructions further cause the processor to:
    transmit device identification information about the plurality of distributed storage devices to an external server;
    request the device identification information from the external server, when an event required to recover the seed value or the mnemonic information occurs;
    receive the device identification information from the external server; and
    transmit the distributed key transmission request using the device identification information.

11. The electronic device of claim 1, wherein the instructions further cause the processor to:
    determine a storage quantity of distributed keys to be stored in each of the plurality of distributed storage devices based on the device information; and
    distribute and store the plurality of distributed keys in the plurality of distributed storage devices, based on the storage quantity.

12. The electronic device of claim 1, wherein the instructions further cause the processor to:
- determine storage state information indicating whether it is able to obtain a plurality of distributed key values from the plurality of distributed storage devices;
- determine whether it is possible to recover the seed value or the mnemonic information based on the storage state information; and
- output a message associated with distributing and storing the seed value or the mnemonic information through the display, when it is impossible to recover the seed value or the mnemonic information.

13. A server, comprising:
- a memory;
- a communication circuit; and
- a processor connected with the memory and the communication circuit,
- wherein the memory stores instructions, when executed, causing the processor to:
  - obtain device information about a plurality of external electronic devices associated with a user account,
  - receive a distributed key storage request requesting to store a plurality of distributed keys to divide a seed value or mnemonic information for generating a key for performing a digital signature on data to be transmitted to a blockchain network by an electronic device logged in to the server with the user account from the electronic device,
  - select a plurality of distributed storage devices based on the device information, in response to the distributed key storage request,
  - distribute and transmit the plurality of distributed keys to the plurality of distributed storage devices, through the communication circuit, and
  - associate and store identification information of the plurality of distributed storage devices with the user account in the memory.

14. The server of claim 13, wherein the instructions further cause the processor to:
- receive a distributed key recovery request from the electronic device logged in to the server with the user account;
- search for the identification information based on the user account, in response to the distributed key recovery request; and
- transmit the identification information to the electronic device.

15. The server of claim 13, wherein the instructions further cause the processor to:
- receive a distributed key recovery request from the electronic device logged in to the server with the user account;
- search for the identification information based on the user account, in response to the distributed key recovery request;
- obtain the plurality of distributed keys from the plurality of distributed storage devices based on the identification information; and
- transmit the plurality of distributed keys to the electronic device.

16. A method for operating an electronic device, the method comprising:
- obtaining device information about a plurality of external electronic devices using a communication circuit of the electronic device;
- selecting a plurality of distributed storage devices for storing a distributed key from the plurality of external electronic devices, based on the device information;
- generating a plurality of distributed keys to divide a seed value or mnemonic information for generating a key for performing a digital signature on data to be transmitted to a blockchain network; and
- controlling the communication circuit such that the plurality of distributed keys are distributed and transmitted to the plurality of distributed storage devices.

17. The method of claim 16, further comprising:
- encrypting a plurality of distributed key values; and
- controlling the communication circuit to transmit the plurality of encrypted distributed key values to the plurality of distributed storage devices.

18. The method of claim 17, further comprising:
- obtaining user authentication information; and
- encrypting the plurality of distributed key values using the user authentication information.

19. The method of claim 18,
- wherein the user authentication information includes biometric information obtained by a plurality of biometric information inputs, and
- wherein the method further comprises:
  - extracting key information included in common in each of the plurality of biometric information inputs from the biometric information, and
  - encrypting the plurality of distributed key values using the key information.

20. The method of claim 16, further comprising:
- determining a total quantity of the plurality of distributed keys, based on the device information; and
- generating the plurality of distributed keys based on the determined total quantity.

* * * * *